United States Patent
Uehara et al.

(10) Patent No.: US 9,288,155 B2
(45) Date of Patent: Mar. 15, 2016

(54) COMPUTER SYSTEM AND VIRTUAL COMPUTER MANAGEMENT METHOD

(71) Applicant: HITACHI, LTD., Tokyo (JP)

(72) Inventors: Keitaro Uehara, Tokyo (JP); Naoya Hattori, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 60 days.

(21) Appl. No.: 14/178,895

(22) Filed: Feb. 12, 2014

(65) Prior Publication Data

US 2014/0230024 A1   Aug. 14, 2014

(30) Foreign Application Priority Data

Feb. 13, 2013   (JP) ................................. 2013-025050

(51) Int. Cl.
   *G06F 21/64*   (2013.01)
   *H04L 12/911*   (2013.01)
   *H04L 29/06*   (2006.01)
   *G06F 9/455*   (2006.01)

(52) U.S. Cl.
   CPC ............ *H04L 47/70* (2013.01); *G06F 9/45533* (2013.01); *G06F 21/64* (2013.01); *H04L 63/105* (2013.01); *H04L 63/1433* (2013.01)

(58) Field of Classification Search
   CPC .............................. G06F 9/45533; G06F 21/64
   See application file for complete search history.

(56) References Cited

U.S. PATENT DOCUMENTS

| | | | | |
|---|---|---|---|---|
| 7,814,495 B1* | 10/2010 | Lim | ................... | G06F 9/45558 717/168 |
| 8,601,583 B1* | 12/2013 | Chandrasekhar et al. | ...... | 726/24 |
| 2009/0138887 A1 | 5/2009 | Uehara et al. | | |
| 2009/0172799 A1* | 7/2009 | Morgan | .......................... | 726/11 |
| 2009/0204964 A1 | 8/2009 | Foley et al. | | |
| 2010/0042994 A1 | 2/2010 | Vasilevsky et al. | | |
| 2011/0061045 A1 | 3/2011 | Phillips | | |
| 2011/0061046 A1 | 3/2011 | Phillips | | |
| 2011/0202765 A1 | 8/2011 | McGrane et al. | | |
| 2011/0202916 A1 | 8/2011 | VoBa et al. | | |
| 2011/0283279 A1* | 11/2011 | Graves | ................ | G06F 9/45589 718/1 |
| 2012/0151209 A1* | 6/2012 | Visnyak | ................ | H04L 9/3234 713/166 |
| 2012/0291094 A9* | 11/2012 | Forrester et al. | ................... | 726/3 |
| 2012/0311575 A1* | 12/2012 | Song | ..................... | G06F 9/5077 718/1 |
| 2013/0097296 A1* | 4/2013 | Gehrmann | ........... | G06F 9/4856 709/223 |
| 2014/0157363 A1* | 6/2014 | Banerjee | .......................... | 726/2 |

FOREIGN PATENT DOCUMENTS

| | | |
|---|---|---|
| JP | 2009-1517445 A | 7/2009 |
| JP | 2012-073660 A | 4/2012 |

OTHER PUBLICATIONS

Azab et al., "Hima: A Hypervisor-Based Integrity Measurement Agent", 2009, pp. 461-470.*
Berger et al., "vTPM: Virtualizing the Trusted Platform Module", USENIX Association, Security '06:15th USENIX Security Symposium, pp. 305-320.

* cited by examiner

*Primary Examiner* — Thanhnga B Truong
*Assistant Examiner* — Thaddeus Plecha
(74) *Attorney, Agent, or Firm* — Mattingly & Malur, PC

(57) ABSTRACT

A computer system, comprising: a virtual computer system and a verification system, the virtual computer system including: a deployment request reception part for receiving a deployment request; a server search part for searching for a server, for which a security strength equal to or larger than the security strength associated with target image data is set; a deployment instruction part for instructing the retrieved server to deploy the target image data; and a virtual computer management part for generating a virtual computer for executing an application on the retrieved server by using the target image data, and transmitting a integrity report, which is obtained on the boot of the virtual computer for executing the application and used to verify the integrity relating to the virtual computer for executing the application, to a verification server.

12 Claims, 18 Drawing Sheets

VM ALLOCATION TABLE

| VM ID | OVF TYPE | PHYSICAL SERVER ID | ALLOCATED RESOURCE | | COMMUNICATION COUNTERPART VM ID |
|---|---|---|---|---|---|
| | | | NUMBER OF ALLOCATED CPU CORES | ALLOCATED MEMORY AMOUNT | |
| 1 | TRUSTED AUTHENTICATION | 2 | 4 | 4GB | 2 |
| 2 | TRUSTED EXECUTION | 2 | 2 | 2GB | 1 |
| 3 | AUTHENTICATION | 1 | 2 | 2GB | 4 |
| 4 | EXECUTION | 1 | 2 | 2GB | 3 |
| ⋮ | ⋮ | ⋮ | ⋮ | ⋮ | ⋮ |

Fig. 7

PHYSICAL SERVER CONFIGURATION TABLE

| PHYSICAL SERVER ID | NUMBER OF CPU CORES | CPU PERFORMANCE | MEMORY AMOUNT | PRESENCE/ ABSENCE OF EQUIPPED TPM | MANAGEMENT IP ADDRESS |
|---|---|---|---|---|---|
| 1 | 16 | 3GHz | 16GB | ABSENT | 192.168.11.102 |
| 2 | 32 | 2.4GHz | 64GB | PRESENT | 192.168.11.103 |
| 3 | 32 | 3GHz | 32GB | ABSENT | 192.168.11.104 |
| ⋮ | ⋮ | ⋮ | ⋮ | ⋮ | ⋮ |

Fig. 8

VM PACKAGE MANAGEMENT TABLE 1140

| PACKAGE ID 11401 | PACKAGE NAME 11402 | OVF ID 11403 | OVF TYPE 11404 | REQUIRED SECURITY STRENGTH 11405 | REQUIRED RESOURCE 11406 | | | DESTINATION ADDRESS 11410 |
|---|---|---|---|---|---|---|---|---|
| | | | | | REQUIRED CPU PERFORMANCE 11407 | REQUIRED MEMORY AMOUNT 11408 | NUMBER OF REQUIRED VIRTUAL NWs 11409 | |
| 1 | α SIMULATOR | 1 | TRUSTED AUTHENTICATION | 1 | 3200MHz | 2GB | 2 | |
| | | 2 | TRUSTED EXECUTION | 1 | 6400MHz | 4GB | 2 | 203.181.15.121 |
| | | 3 | AUTHENTICATION | 0 | 2400MHz | 2GB | 2 | |
| | | 4 | EXECUTION | 0 | 4800MHz | 2GB | 2 | |
| ... | ... | ... | ... | ... | ... | ... | ... | ... |

Fig. 9

COMPUTER SYSTEM AND VIRTUAL COMPUTER MANAGEMENT METHOD

CLAIM OF PRIORITY

The present application claims priority from Japanese patent application JP 2013-025050 filed on Feb. 13, 2013, the content of which is hereby incorporated by reference into this application.

BACKGROUND OF THE INVENTION

This invention relates to a technology for safely distributing a virtual computer on a cloud computing platform and authenticating the virtual computer.

As computer resources are becoming more integrated and more enhanced in performance due to advancement in a semiconductor technology, further progress is being made in a virtualization technology aiming at effective use of the computer resources and reduction in operation cost. In addition, a standard (open virtual format; OVF) for distributing a virtual server (virtual machine; VM) as an image file has penetrated the market, allowing the virtual server to be operated on an arbitrary physical server.

On the other hand, applications executed on the physical server include a large number of applications that can be executed under a certain limitation such as a license.

In a case where a large number of VMs for executing such applications as described above on a cloud system, it is necessary to verify whether or not the application on each VM is being executed in accordance with a license contract and to verify the VM itself. The VM is verified because it is necessary to examine whether or not the VM itself has been tampered due to a root kit, malware, or the like, to have the application executed illegally.

There is known a method of using a trusted platform module (TPM) as a method for the physical server to verify integrity on a boot (see US 2009/0204964 and US 2011/0202765). The TPM is a chip built into hardware of the physical server, and hardware and software specifications thereof are developed by Trusted Computing Group (TCG). Examples of the TPM are disclosed in US 2009/0204964 and US 2011/0202765.

In addition, there is also known a technology for emulating a physical TPM by using a virtual TPM in order for a hypervisor to verify the integrity on the boot of the VM. An example thereof is disclosed in "vTPM: Virtualizing the trusted platform module".

SUMMARY OF THE INVENTION

To provide an application service by using a cloud, an application vendor distributes an OVF image file of the VM for executing a predetermined application on the cloud system. In this case, a management server or the like on the cloud system verifies the integrity of the VM and the application, and in a case where the integrity is confirmed, boots the VM for executing the application.

The management server or the like needs to verify the VM and the application by transmitting an integrity report to a third party engine. Further, the application is executed on the cloud system in accordance with a user's request, and hence a function for allowing the application vendor to manage the license of the application is not provided.

Therefore, in the cloud system, it is necessary to realize a safe boot of the VM, and it is also necessary for the application vendor to grasp a usage status of the application executed on the cloud system.

This invention has been made in order to solve the above-mentioned problem. In other words, this invention provides a system and a method for ensuring integrity of a VM and an application and realizing license management of an application vendor on a cloud system.

The present invention can be appreciated by the description which follows in conjunction with the following figures, wherein: a computer system, comprising: a plurality of computers each including: a processor; a memory coupled to the processor; and a network interface coupled to the processor; a virtual computer system including a computer resource allocated to at least one virtual computer; and a verification system for verifying integrity relating to the at least one virtual computer. The virtual computer system includes: a plurality of servers for providing the computer resource to the at least one virtual computer; a management computer for managing a plurality of virtual computers that operate on each of the plurality of servers; and an image data storage part for storing image data for generating a virtual computer for executing an application. The verification system includes a verification server for verifying the integrity relating to the virtual computer for executing the application. The virtual computer system has: image data management information in which the image data and a security strength required on a boot of the virtual computer for executing the application generated based on the image data are associated with each other; and server management information in which the server and a security strength set for the server are associated with each other. The virtual computer system includes: a deployment request reception part for receiving, from a user using the virtual computer system, a deployment request including identification information on target image data for generating the virtual computer for executing the application; a server search part for searching for the server, for which a security strength equal to or larger than the security strength associated with the target image data is set, based on the image data management information and the server management information; a deployment instruction part for instructing the retrieved server to deploy the target image data; and a virtual computer management part for generating the virtual computer for executing the application on the retrieved server by using the target image data, and transmitting a first integrity report, which is obtained on the boot of the virtual computer for executing the application and used to verify the integrity relating to the virtual computer for executing the application, to the verification server. The virtual computer management part receives a result of a verification process with respect to the first integrity report transmitted from the verification server. The deployment request reception part outputs a deployment result for the target image data based on the received result of the verification process with respect to the first integrity report.

According to the exemplary embodiment of this invention, in a virtual computer system, the integrity relating to a virtual computer is verified, to thereby allow a safe application service to be provided. In other words, it is possible to provide a secure application service.

Objects, configurations, and effects other than those described above become apparent from descriptions of the following embodiments.

BRIEF DESCRIPTION OF THE DRAWINGS

The present invention can be appreciated by the description which follows in conjunction with the following figures, wherein:

FIG. 7 is an explanatory diagram showing an example of a VM allocation table according to the first embodiment of this invention;

FIG. 8 is an explanatory diagram showing an example of a physical server configuration table according to the first embodiment of this invention;

FIG. 9 is an explanatory diagram illustrating an example of a VM package management table according to the first embodiment of this invention;

DETAILED DESCRIPTION OF THE PREFERRED EMBODIMENTS

Now, a description is made of embodiments with reference to the accompanying drawings.

First Embodiment

Figure 1:
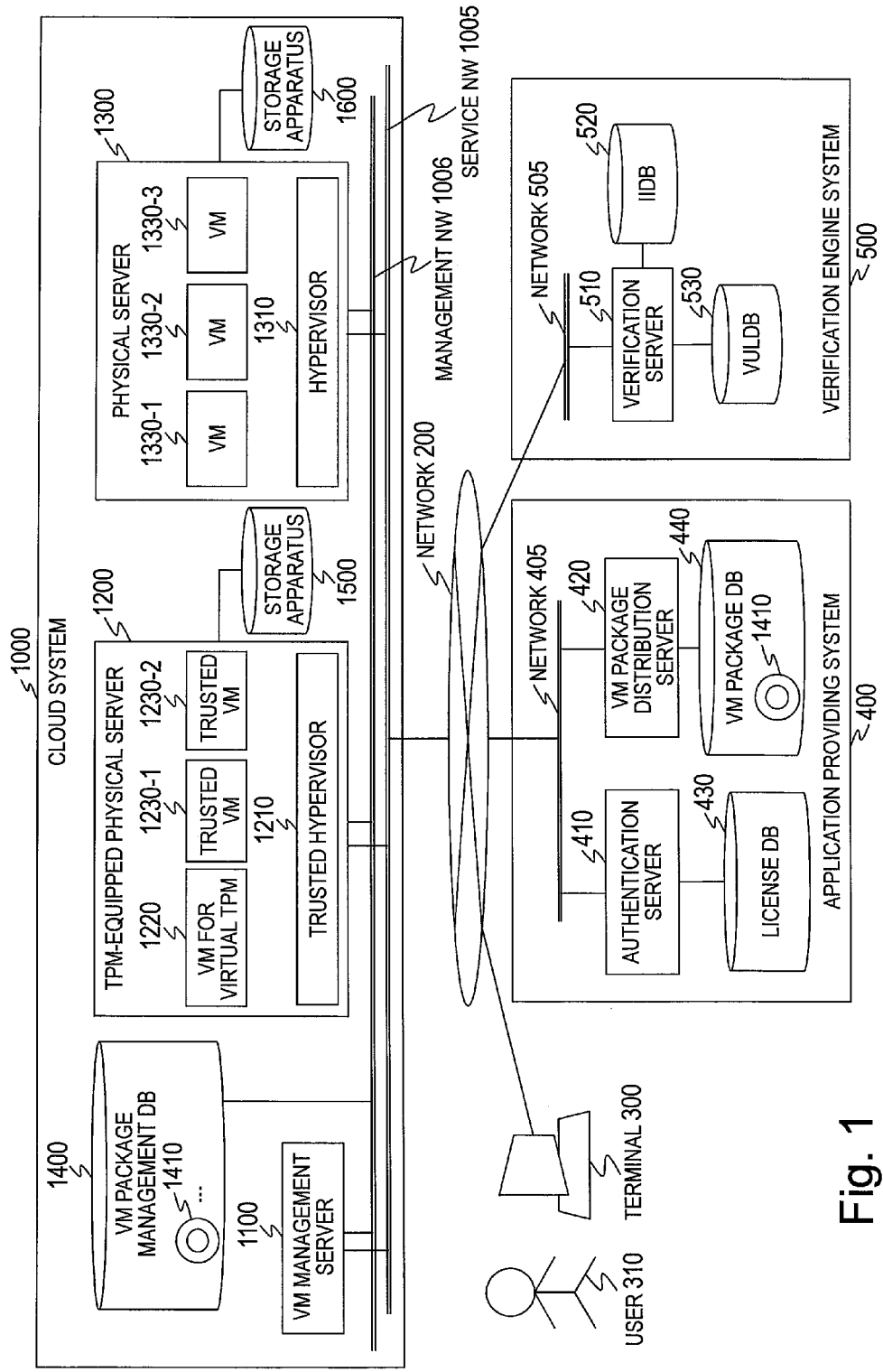
FIG. 1 is an explanatory diagram illustrating an example of a configuration of a computer system according to a first embodiment of this invention.

FIG. 1 is an explanatory diagram illustrating an example of a configuration of a computer system according to a first embodiment of this invention.

As illustrated in FIG. 1, the computer system according to the first embodiment includes a cloud system 1000, an application providing system 400, and a verification engine system 500. The cloud system 1000, the application providing system 400, and the verification engine system 500 are coupled to one another through a network 200. It should be noted that this invention is not limited to a specific type of network 200, and any network such as a wide area network (WAN) or a local area network (LAN) may be used. Further, this invention is not limited to a specific coupling method for the network 200, and the network 200 may be coupled in any one of a wired manner and a wireless manner.

Further, a terminal 300 used by a user 310 is coupled to the network 200. The user 310 is allowed to use a cloud service by operating the terminal 300.

The cloud system 1000 is a computer system of a provider that provides a cloud service. Provided in the cloud service is a service system formed of a virtual computer (VM) for executing a predetermined application in accordance with a wish of the user 310. The user 310 uses the provided service system to use a predetermined service or the like. It should be noted that this invention is not limited to a specific kind of service system provided by using the cloud service.

The cloud system 1000 includes a VM management server 1100, a plurality of TPM-equipped physical servers 1200, a plurality of physical servers 1300, and a VM package management DB 1400.

The VM management server 1100, the plurality of TPM-equipped physical servers 1200, the plurality of physical servers 1300, and the VM package management DB 1400 are coupled to one another through a management NW 1006. Further, the VM management server 1100, the plurality of TPM-equipped physical servers 1200, the plurality of physical servers 1300, and the VM package management DB 1400 are coupled to the network 200 through the service NW 1005.

The VM management server 1100 is a computer for managing VMs generated on the TPM-equipped physical server 1200 and the physical server 1300. The hardware configuration and the software configuration of the VM management server 1100 are described later in detail with reference to FIG. 2.

The plurality of TPM-equipped physical servers 1200 and the plurality of physical servers 1300 are computers for providing computer resources allocated to the VMs. The TPM-equipped physical server 1200 includes a TPM 1270 illustrated in FIG. 3, which serves as a security chip, as described later. On the other hand, the physical server 1300 does not include TPM.

A trusted hypervisor 1210 operates on the TPM-equipped physical server 1200. Further, a VM 1220 for the virtual TPM and a trusted VM 1230, which are managed by the trusted hypervisor 1210, operate on the TPM-equipped physical server 1200.

Here, the trusted hypervisor 1210 and the trusted VM 1230 represent a hypervisor and a VM, respectively, which have been confirmed to be free from tampering in a verification process described later. In other words, the trusted hypervisor 1210 and the trusted VM 1230 are a secure hypervisor and a secure VM, respectively.

A hypervisor 1310 operates on the physical server 1300. Further, a VM 1330 managed by the hypervisor 1310 operates on the physical server 1300.

In this embodiment, the trusted hypervisor 1210 and the trusted VM 1230 are guaranteed to be free from tampering as described later, and therefore have all functions enabled. On the other hand, the hypervisor 1310 and the VM 1330 have only part of functions enabled.

The hardware configurations and the software configurations of the TPM-equipped physical server 1200 and the physical server 1300 are described later in detail with reference to FIG. 3 and FIG. 4.

It should be noted that a storage apparatus 1500 is coupled to the TPM-equipped physical server 1200, and a storage apparatus 1600 is coupled to the physical server 1300.

The VM package management DB 1400 is a database for managing a VM package 1410 necessary to operate a VM. The VM package 1410 is transmitted from the application providing system 400 as described later.

The application providing system 400 is a computer system of an application vendor, for providing a predetermined application. The application providing system 400 transmits the VM package 1410 to the cloud system 1000. Further, the application providing system 400 manages a license of the application.

The application providing system 400 includes an authentication server 410, a VM package distribution server 420, a license DB 430, and a VM package DB 440. The authentication server 410 and the VM package distribution server 420 are coupled to the network 200 through a network 405.

The authentication server 410 receives an integrity report from the cloud system 1000, and transfers the integrity report to the verification engine system 500. Further, the authentication server 410 updates the license DB 430 based on the integrity report. This allows the application vendor to grasp a usage status of the application. For example, it is possible to grasp a number of times that the application is executed or other such information. Therefore, the application providing system 400 can appropriately manage the license of the application whose condition is, for example, billing based on the number of times that the application is executed.

It should be noted that information stored in the license DB 430 may be any kind of information that allows an execution status of the application on the cloud system 1000 to be grasped. For example, the license DB 430 stores identification information on the VM package 1410, identification information on the user 310, and information associated with the integrity report, and the like.

The VM package distribution server 420 distributes the VM package 1410 stored in the VM package DB 440 to the cloud system 1000. This allows the application to be provided to an indefinitely large number of users 310.

It should be noted that this invention is not limited to a specific timing at which the VM package 1410 is distributed. The VM package 1410 may be distributed when the application vendor wishes, or may be distributed in response to a request made by the user 310. In this embodiment, the VM package 1410 for realizing the application wished by the user 310 is distributed to the cloud system 1000 in advance.

The verification engine system 500 verifies whether or not the VM generated by using the VM package 1410 has been tampered, whether or not the application has been tampered, and the like. The verification engine system 500 includes the verification server 510, an integrity information database (IIDB) 520, and a vulnerability database (VULDB) 530. It should be noted that the verification server 510 is coupled to the network 200 through a network 505.

The IIDB 520 is a database for storing data necessary for the verification process. In this embodiment, the IIDB 520 stores information on a hash value of the VM generated by using the VM package 1410.

The VULDB 530 is a database for storing data relating to vulnerability. Based on the IIDB 520 and the VULDB 530, the verification server 510 verifies, for example, whether or not the VM has been tampered and whether or not a user is spoofed. Further, the verification server 510 transmits a verification result to the application providing system 400.

It should be noted that a known verification process may be used as the verification process executed by the verification server 510, and hence, in this embodiment, a detailed description thereof is omitted.

In this embodiment, the verification result is transmitted to the cloud system 1000 via the application providing system 400.

Figure 2:
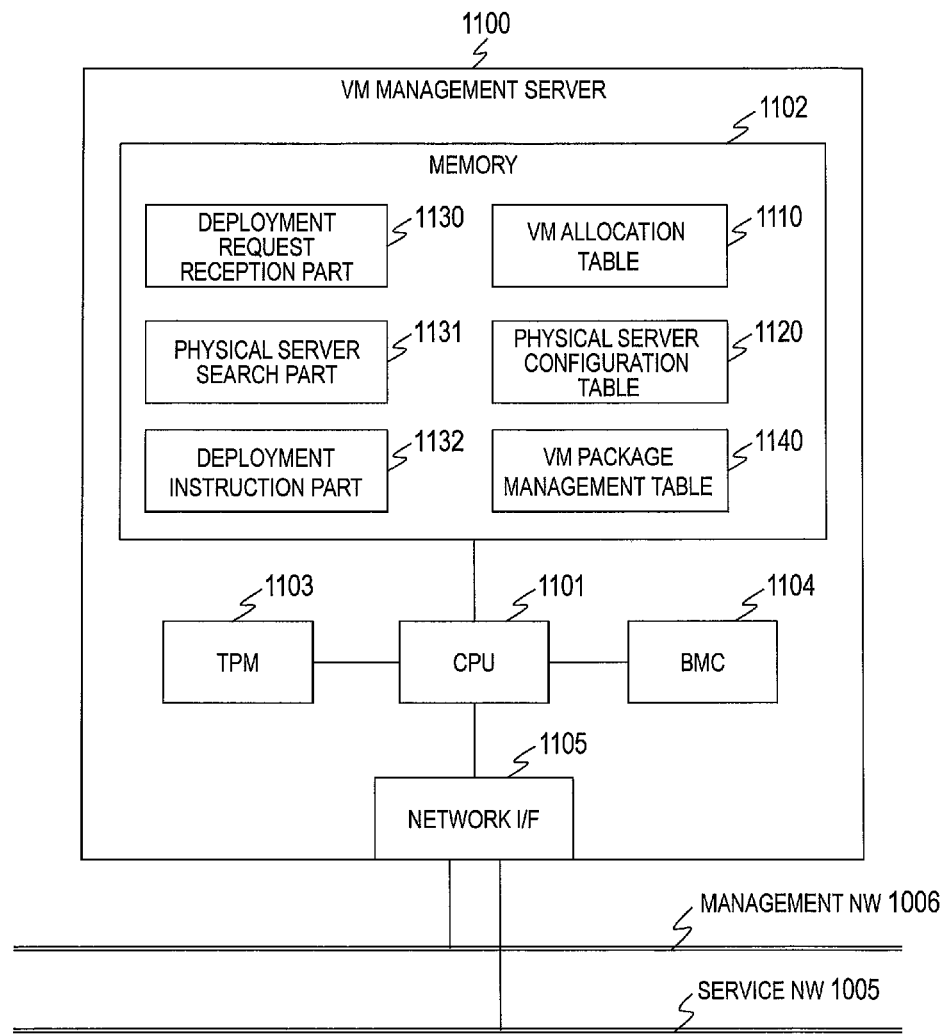
FIG. 2 is a block diagram illustrating an example of hardware configuration and software configuration of the VM management server according to the first embodiment of this invention.

FIG. 2 is a block diagram illustrating an example of the hardware configuration and the software configuration of the VM management server 1100 according to the first embodiment of this invention.

The VM management server 1100 includes, as hardware components, a CPU 1101, a memory 1102, a trusted platform module (TPM) 1103, a baseboard management controller (BMC) 1104, and a network interface 1105.

The CPU 1101 executes a program stored in the memory 1102. The CPU 1101 can realize a function of the VM management server 1100 by executing the program. In the following description, a process described by taking the program as a subject indicates that the program is executed by the CPU 1101.

The memory 1102 stores programs executed by the CPU 1101 and information necessary to execute the programs. The programs and the information stored in the memory 1102 are described later.

The TPM 1103 is a chip for realizing a boot of a secure VM, a secure OS, or the like. The TPM 1103 includes an encryption co-processor for performing random number generation and an RSA encryption process and a storage area for storing information such as a cryptographic key. The TPM 1103 is described later in detail with reference to FIG. 5.

The BMC 1104 is a chip for providing a management function of the VM management server 1100. The management function provided by the BMC 1104 includes a fault detection function, a power control function, and a fault reporting function.

The network interface 1105 is an interface that allows communications to/from an external apparatus through a network. In this embodiment, the network interface 1105 is coupled to the service NW 1005 and the management NW 1006.

Here, the programs and the information stored in the memory 1102 are described.

The memory 1102 stores the programs for realizing a deployment request reception part 1130, a physical server search part 1131, and a deployment instruction part 1132. Further, the memory 1102 stores a VM allocation table 1110, a physical server configuration table 1120, and a VM package management table 1140.

The deployment request reception part 1130 receives a deployment request from the user 310. The deployment request includes a name of the VM package 1410. The physical server search part 1131 searches for the physical server that satisfies a predetermined condition based on the deployment request. The deployment instruction part 1132 transmits a deployment instruction for a predetermined VM package 1410 to the retrieved physical server.

The VM allocation table 1110 stores information for managing the VM operating on each physical server. The VM allocation table 1110 is described later in detail with reference to FIG. 7. The physical server configuration table 1120 stores information for managing the configuration of the physical server in the cloud system 1000. The physical server configuration table 1120 is described later in detail with reference to FIG. 8.

The VM package management table 1140 stores information relating to the VM package 1410 stored in the VM package management DB 1400. The VM package management table 1140 is described later in detail with reference to FIG. 9.

It should be noted that the programs and the information stored in the memory 1102 may be stored in a storage apparatus (not shown). In this case, the CPU 1101 reads the programs and the information from the storage apparatus, and expands the read programs and the information onto the memory 1102.

It should be noted that the VM management server 1100 may be provided with the respective functional parts illustrated in FIG. 2 as one functional part. For example, it is conceivable that the respective functional parts are provided as a deployment processing part.

Figure 3:
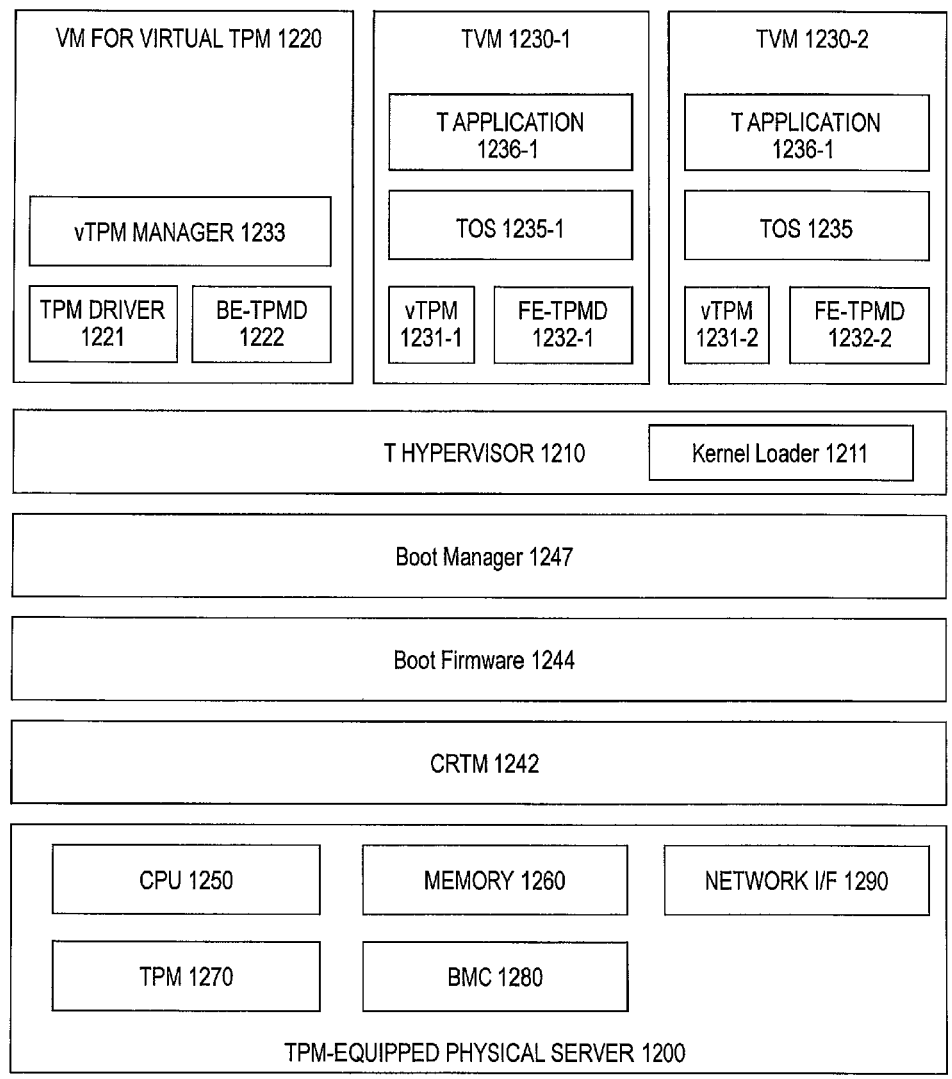
FIG. 3 is a block diagram illustrating an example of hardware configuration and software configuration of a TPM-equipped physical server according to the first embodiment of this invention.
Figure 4:
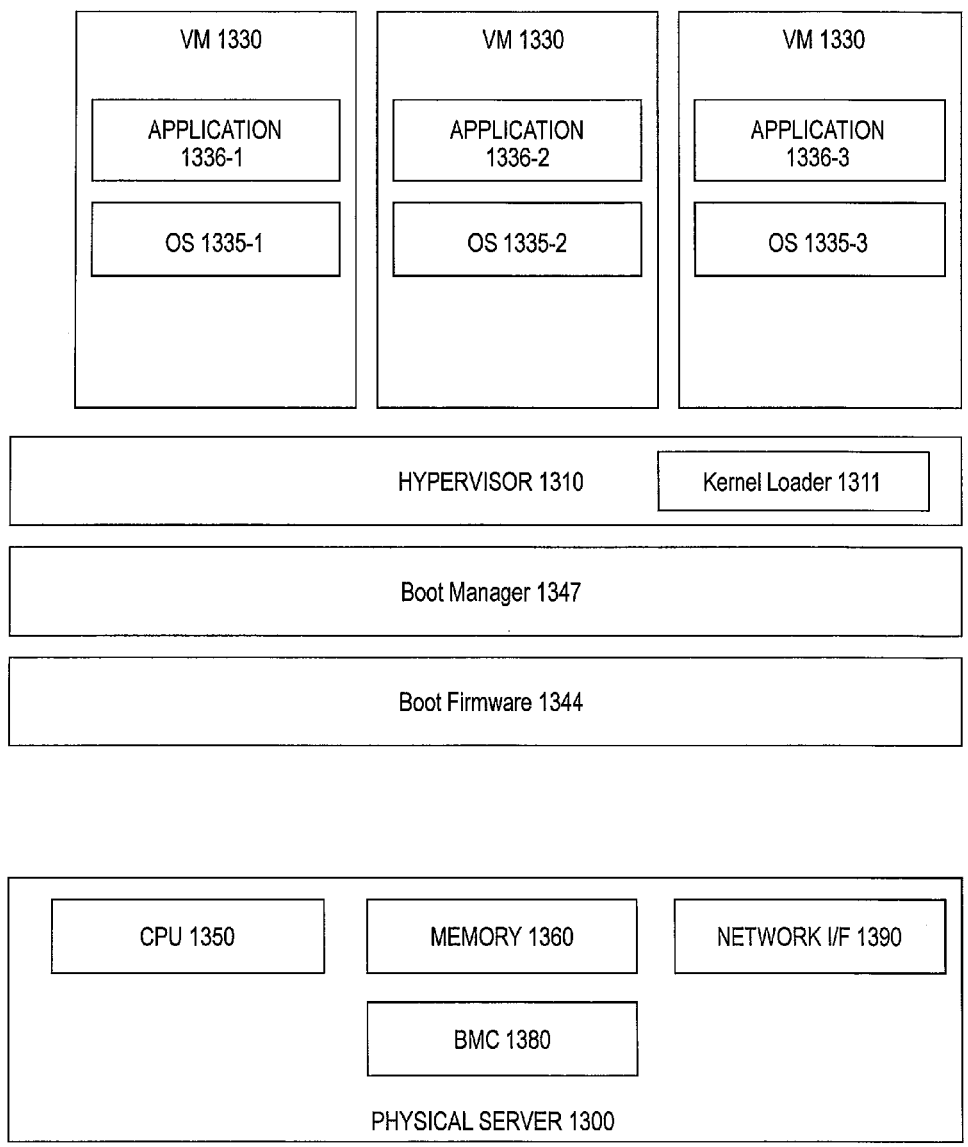
FIG. 4 is a block diagram illustrating an example of hardware configuration and software configuration of physical server according to the first embodiment of this invention.

FIG. 3 is a block diagram illustrating an example of the hardware configuration and the software configuration of the TPM-equipped physical server 1200 according to the first embodiment of this invention. FIG. 4 is a block diagram illustrating an example of the hardware configuration and the software configuration of the physical server 1300 according to the first embodiment of this invention.

The TPM-equipped physical server 1200 includes, as hardware components, a CPU 1250, a memory 1260, the TPM 1270, a BMC 1280, and a network interface 1290.

The CPU 1250, the memory 1260, the TPM 1270, the BMC 1280, and the network interface 1290 are the same as the CPU 1101, the memory 1102, the TPM 1103, the BMC 1104, and the network interface 1105, respectively, and hence descriptions thereof are omitted.

Further, the TPM-equipped physical server 1200 includes a core root of trust measurement (CRTM) 1242, a boot firmware 1244, and a boot manager 1247.

The CRTM 1242 is a first code that is first executed in a trusted boot, and is stored in advance in a chip on a board of the TPM-equipped physical server 1200.

The boot firmware 1244 is software for managing the TPM-equipped physical server 1200 before the trusted hypervisor 1210 is booted. For example, a BIOS is conceivable as the boot firmware 1244.

The boot manager 1247 is software for booting a hypervisor, an OS, and the like. The boot manager 1247 is read onto the memory 1260 from the storage apparatus 1500 or the like by the CPU 1250, and is executed by the CPU 1250.

The trusted hypervisor 1210 is a hypervisor booted by using the TPM 1270. The trusted hypervisor 1210 includes a kernel loader 1211, and manages the VM 1220 for the virtual TPM and a plurality of trusted VMs 1230.

The trusted VM 1230 is a VM for executing a predetermined application. The trusted VM 1230 includes a trusted OS 1235, a trusted application 1236, and a front-end TPM driver (FE-TPMD) 1232.

Further, a virtual TPM (vTPM) 1231 is allocated to the trusted VM 1230. It should be noted that a virtual CPU (not shown), a virtual memory (not shown), a virtual network interface (not shown), and the like are also allocated to the trusted VM 1230.

The trusted OS 1235 and the trusted application 1236 operate the vTPM 1231 through the FE-TPMD 1232.

The VM 1220 for the virtual TPM is a VM for realizing a vTPM, and includes a vTPM manager 1233, a TPM driver 1221, and a back-end TPM driver (BE-TPMD) 1222.

The vTPM manager 1233 emulates an operation performed for the vTPM 1231. The vTPM manager 1233 receives the operation, which is performed through the FE-TPMD 1232, through the BE-TPMD 1222. In addition, the vTPM manager 1233 operates the TPM 1270 through the TPM driver 1221.

It should be noted that, in this embodiment, the VM 1220 for the virtual TPM emulates the TPM 1270, but this invention is not limited thereto. For example, the trusted hypervisor 1210 may emulate the TPM 1270. In this case, the trusted hypervisor 1210 includes the TPM driver 1221 and the vTPM manager 1233.

The physical server 1300 includes, as hardware components, a CPU 1350, a memory 1360, a BMC 1380, and a network interface 1390.

The CPU 1350, the memory 1360, the BMC 1380, and the network interface 1390 are the same as the CPU 1101, the memory 1102, the BMC 1104, and the network interface 1105, respectively, and hence descriptions thereof are omitted.

Further, the physical server 1300 includes a boot firmware 1344 and a boot manager 1347. The boot firmware 1344 and the boot manager 1347 are the same as the boot firmware 1244 and the boot manager 1247, respectively, and hence descriptions thereof are omitted.

The hypervisor 1310 is a hypervisor booted by using a normal boot method. The hypervisor 1310 includes a kernel loader 1311, and manages a plurality of VMs 1330.

The VM 1330 is a VM for executing a predetermined application. The VM 1330 includes an OS 1335 and an application 1336.

A virtual CPU (not shown), a virtual memory (not shown), a virtual network interface (not shown), and the like are also allocated to the VM 1330. However, the vTPM 1231 is not allocated to the VM 1330.

Figure 5:
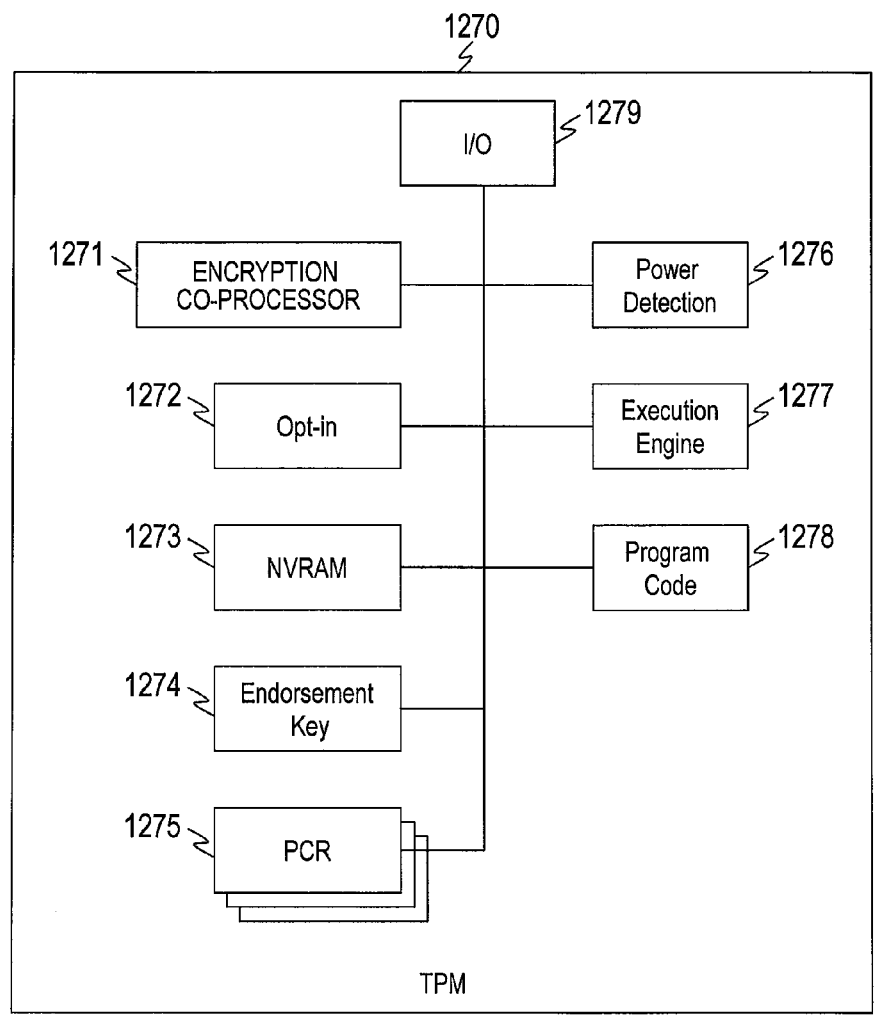
FIG. 5 is a block diagram illustrating a configuration example of the TPM according to the first embodiment of this invention.

FIG. 5 is a block diagram illustrating a configuration example of the TPM 1270 according to the first embodiment of this invention.

The TPM 1270 includes an encryption co-processor 1271, an opt-in 1272, an NVRAM 1273, an endorsement key 1274, a platform configuration register (PCR) 1275, a power detection 1276, an execution engine 1277, a program code 1278, and an I/O 1279.

The encryption co-processor 1271 performs generation of random data, generation of an asymmetric cryptographic key (public key and secret key), encryption of data, and the like. The encryption co-processor 1271 includes a random number generation part, an SHA-1 operation part, and an RSA operation part. Further, the encryption co-processor 1271 may include a digital signature algorithm (DSA) operation part and an elliptic curve operation part.

The opt-in 1272 manages a status of the TPM 1270. Specifically, the opt-in 1272 controls the status such as power-on/off, enabled/disabled, or started/stopped of the TPM 1270.

The NVRAM 1273 stores the status of the TPM 1270, identification information unique to the TPM 1270, and the like. Further, the NVRAM 1273 stores the endorsement key 1274. Here, the endorsement key 1274 indicates a pair of a public key and a secret key.

The PCR 1275 is a register for storing a predicted value relating to the configuration of the physical server at a time of the trusted boot (hash value relating to a boot component). The hash value relating to the boot component is calculated based on the measured value indicating the status, the configuration, or the like of the boot component. It should be noted that the TPM 1270 includes a plurality of PCRs 1275.

The power detection 1276 manages a power source of the TPM 1270. The execution engine 1277 executes the program code 1278 for executing a TPM command received through the I/O 1279. Here, the program code 1278 is a program code for realizing each kind of processing of the TPM 1270. The I/O 1279 couples the TPM 1270 and the external apparatus to each other.

It should be noted that the TPM 1270 according to this invention is not limited to the configuration illustrated in FIG. 5, and it suffices that at least the PCR 1275 is provided thereto.

Next, a description is made of the VM package 1410.

Figure 6:
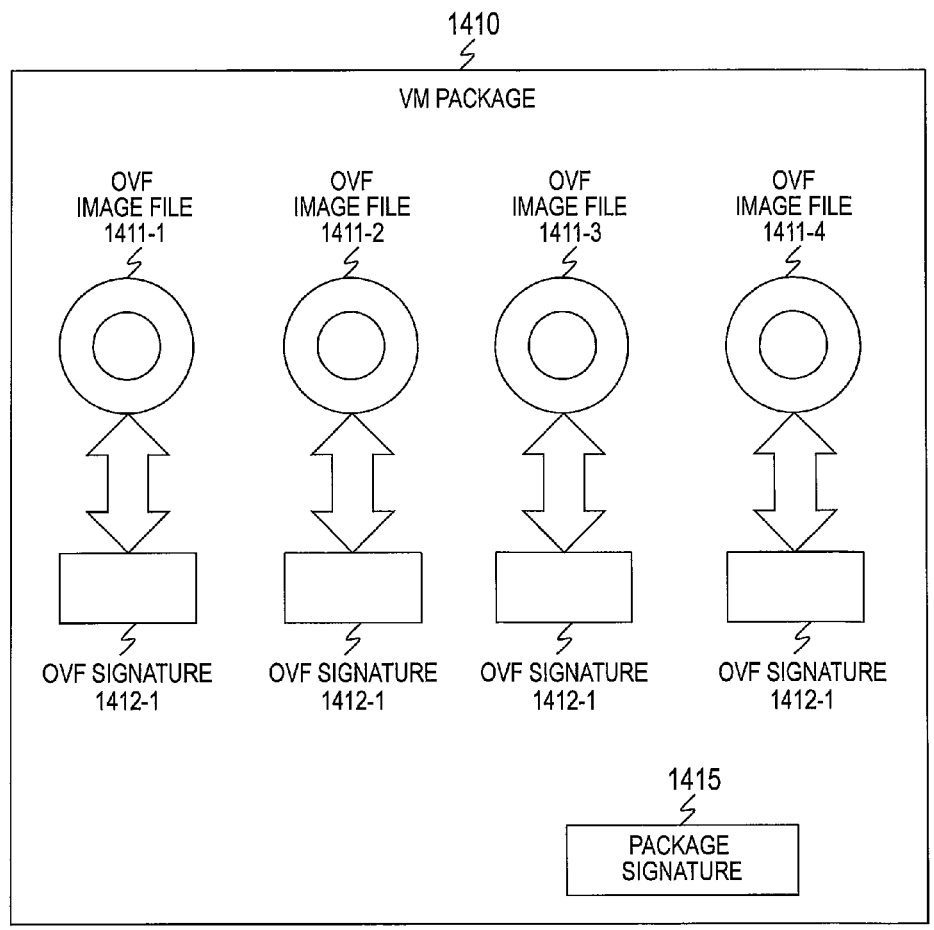
FIG. 6 is an explanatory diagram illustrating an example of a VM package according to the first embodiment of this invention.

FIG. 6 is an explanatory diagram illustrating an example of the VM package 1410 according to the first embodiment of this invention.

The VM package 1410 includes a plurality of OVF image files 1411, a plurality of OVF signatures 1412, and a package signature 1415.

The OVF image file 1411 is an OVF image file for generating the VM for executing the predetermined application.

The plurality of OVF signatures 1412 are digital signatures used for verifying, for example, whether or not the OVF image file 1411 has been tampered (integrity of the OVF image file 1411). In this embodiment, one OVF signature 1412 is associated with one OVF image file 1411.

Further, in this embodiment, the VM package 1410 includes a plurality of kinds of OVF image file 1411 for each VM generated on the TPM-equipped physical server 1200 or the physical server 1300 and each kind of application executed on the VM. Further, the VM package 1410 includes the OVF image file 1411 for generating the VM 1220 for the virtual TPM.

The package signature 1415 is a digital signature used for verifying the integrity of the VM package 1410 itself.

Next, a description is made of a table had in the VM management server 1100.

FIG. 7 is an explanatory diagram showing an example of the VM allocation table 1110 according to the first embodiment of this invention.

The VM allocation table 1110 includes a VM ID 1111, an OVF type 1112, a physical server ID 1113, an allocated resource 1114, and a communication counterpart VM ID 1117.

The VM ID 1111 is an identifier for uniquely identifying the VM operating within the cloud system 1000.

The OVF type 1112 is information for identifying a type of the OVF image file 1411 used for generating the VM corresponding to the VM ID 1111.

In the example shown in FIG. 7, there exist four kinds of OVF image file 1411 for a VM for trusted authentication, a VM for trusted execution, a VM for authentication, and a VM for execution.

The VM for trusted authentication and the VM for authentication are VMs for executing an authentication process for the application in cooperation with the verification engine system 500. The VM for trusted execution and the VM for execution are VMs for executing the application. Further, the VM for trusted authentication and the VM for trusted execution are secure VMs whose integrity is guaranteed, and the VM for authentication and the VM for execution are VMs whose integrity is not guaranteed.

In the first embodiment, it is assumed that the authentication process performed after the application is started is not taken into consideration. In a second embodiment of this invention, a description is made of the authentication process performed after the application is started.

The physical server ID 1113 is an identifier for uniquely identifying the physical server on which the VM corresponding to the VM ID 1111 operates.

The allocated resource 1114 is information relating to the computer resource allocated to the VM corresponding to the VM ID 1111. The allocated resource 1114 includes a number of allocated CPU cores 1115 and an allocated memory amount 1116. The number of allocated CPU cores 1115 is the number of CPU cores allocated to the VM. The allocated memory amount 1116 is a memory capacity allocated to the VM.

It should be noted that the allocated resource 1114 may store information such as a clock frequency of the CPU and a network bandwidth.

The communication counterpart VM ID 1117 is an identifier for uniquely identifying another VM to/from which the VM corresponding to the VM ID 1111 communicates.

FIG. 8 is an explanatory diagram showing an example of the physical server configuration table 1120 according to the first embodiment of this invention.

The physical server configuration table 1120 includes a physical server ID 1121, a number of CPU cores 1122, CPU performance 1123, a memory amount 1124, presence/absence of the equipped TPM 1125, a management IP address 1126.

The physical server ID 1121 is an identifier for uniquely identifying the physical server, and is the same information as the physical server ID 1113.

The number of CPU cores 1122 is the number of cores of the CPU provided to the physical server corresponding to the physical server ID 1121. The CPU performance 1123 is performance of the CPU provided to the physical server corresponding to the physical server ID 1121. In this embodiment, the clock frequency of the CPU is stored as the CPU performance. The memory amount 1124 is the capacity of the memory provided to the physical server corresponding to the physical server ID 1121.

The presence/absence of the equipped TPM 1125 is information indicating whether or not the physical server corresponding to the physical server ID 1121 includes the TPM 1270. The presence/absence of the equipped TPM 1125 stores "present" for the physical server including the TPM 1270 and "absent" for the physical server that does not include the TPM 1270.

With this configuration, it is understood that the server corresponding to the physical server ID 1121 is the TPM-equipped physical server 1200 in a case of the presence/absence of the equipped TPM 1125 is "present" and that the server corresponding to the physical server ID 1121 is the physical server 1300 in a case of the presence/absence of the equipped TPM 1125 is "absent".

In this embodiment, the presence/absence of the equipped TPM 1125 is a column relating to a security strength set for the physical server. Therefore, a column called "setting security strength 1125" may be used instead of the presence/absence of the equipped TPM 1125. In this case, the setting security strength 1125 stores a value in the same manner as in a required security strength 11405 shown in FIG. 9.

The management IP address 1126 is an IP address of the physical server corresponding to the physical server ID 1121 within a management NW 1006.

FIG. 9 is an explanatory diagram illustrating an example of the VM package management table 1140 according to the first embodiment of this invention.

The VM package management table 1140 includes a VM package ID 11401, a VM package name 11402, an OVF ID 11403, an OVF type 11404, a required security strength 11405, a required resource 11406, and a destination address 11410.

The VM package ID 11401 is an identifier for uniquely identifying the VM package 1410 included in the VM package management DB 1400. The VM package name 11402 is a name of the VM package 1410 corresponding to the VM package ID 11401. The VM package name 11402 is a name set by the application vendor that provides the application.

The OVF ID 11403 is an identifier of the OVF image file 1411 included in the VM package 1410 corresponding to the VM package ID 11401. The OVF type 11404 is information for identifying the type of the OVF image file 1411 corresponding to the OVF ID 11403. The OVF type 11404 is the same information as the OVF type 1112.

The required security strength 11405 is information indicating a security strength required at a time of deployment of the OVF image file 1411 corresponding to the OVF ID 11403. In this embodiment, the required security strength 11405 stores "1" in a case where the OVF image file 1411 is deployed onto the TPM-equipped physical server 1200. Further, the required security strength 11405 stores "0" in a case where the OVF image file 1411 is deployed onto the physical server 1300. It should be noted that the value stored in the required security strength 11405 is not limited to "0" or "1".

The required resource 11406 is information on the computer resources necessary for the VM generated by using the OVF image file 1411 corresponding to the OVF ID 11403. The required resource 11406 includes required CPU performance 11407, a required memory amount 11408, and a number of required virtual NWs 11409.

The required CPU performance 11407 is information relating to the performance of the CPU necessary for the VM generated by using the OVF image file 1411. The required memory amount 11408 is information relating to an amount of memory necessary for the VM generated by using the OVF image file 1411. The number of required virtual NWs 11409 is information relating to a number of virtual networks necessary for the VM generated by using the OVF image file 1411.

The destination address 11410 is an IP address of the application providing system 400 for providing the VM package 1410 corresponding to the VM package ID 11401. In this embodiment, in a case where a deployment process is executed, the integrity report is transmitted to the IP address corresponding to the destination address 11410.

Now, a detailed description is made of processing according to this embodiment with reference to a flowchart.

Figure 10:
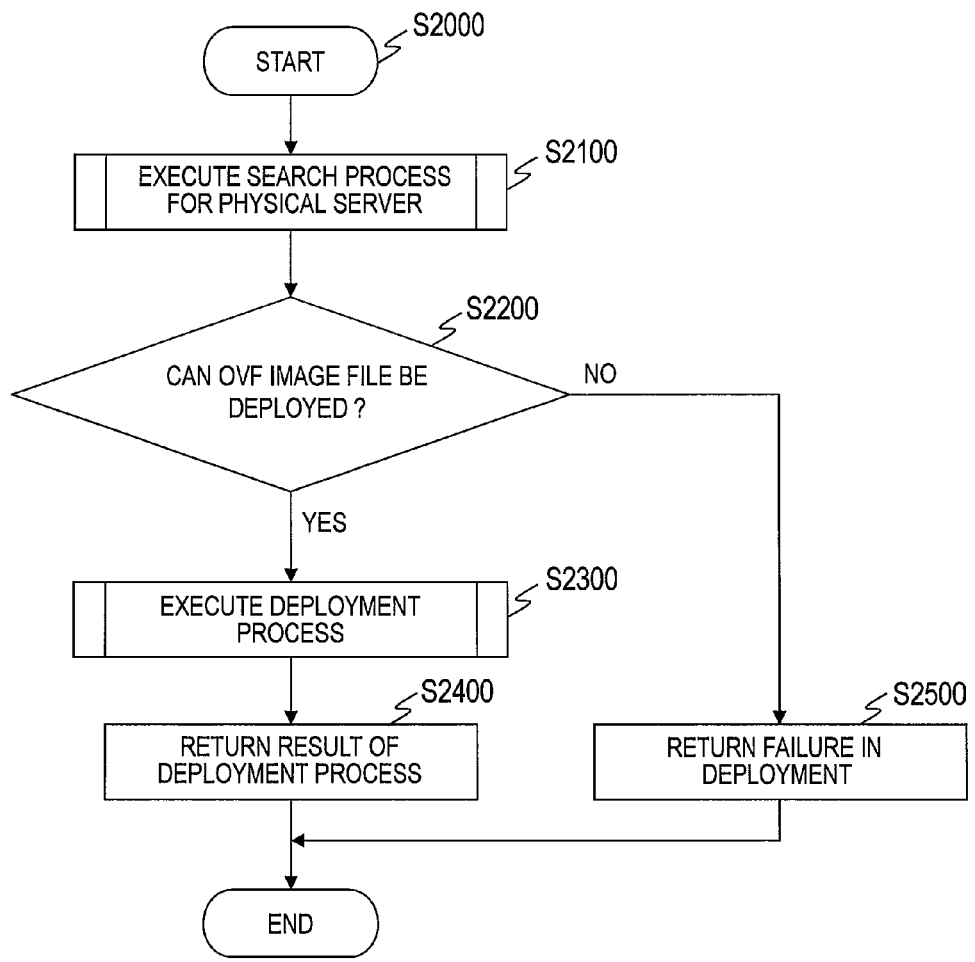
FIG. 10 is a flowchart illustrating a processing executed by the VM management server according to the first embodiment of this invention in a case of receiving the deployment request.

FIG. 10 is a flowchart illustrating the processing executed by the VM management server 1100 according to the first embodiment of this invention, in a case of receiving the deployment request.

In a case where the deployment request is received from the user 310, the VM management server 1100 starts the processing (Step S2000). Specifically, the deployment request reception part 1130 receives the deployment request transmitted from the terminal 300 through the network 200 and the service NW 1005.

It should be noted that the deployment request includes the information for identifying the VM package 1410 serving as a deployment target. For example, the identifier of the VM package 1410, the name of the VM package 1410, or the like is included therein. In this embodiment, it is assumed that the deployment request includes the name of the VM package 1410.

In the following description, the OVF image file 1411 included in the designated VM package 1410 is also referred to as "target OVF image file 1411".

The VM management server 1100 executes a search process for the physical server based on the received deployment request (Step S2100). Specifically, the physical server search part 1131 searches for the physical server that satisfies a deployment condition for each of the target OVF image files 1411. Here, the deployment condition represents a condition for deploying the target OVF image file 1411.

It should be noted that the search process for the physical server is described later in detail with reference to FIG. 11.

The VM management server 1100 determines based on a result of the search process for the physical server whether or not all the target OVF image files 1411 can be deployed (Step S2200).

In a case where it is determined that not all the target OVF image files 1411 can be deployed, the VM management server 1100 returns the fact that the deployment has failed to the user 310 (Step S2500), and the processing is brought to an end. Specifically, the deployment request reception part 1130 notifies the terminal 300 that the deployment has failed through the service NW 1005 and the network 200.

In a case where it is determined that all the target OVF image files 1411 can be deployed, the VM management server 1100 executes the deployment process (Step S2300). Specifically, the deployment instruction part 1132 deploys the target OVF image file 1411 onto the retrieved physical server. It should be noted that the deployment process is described later in detail with reference to FIG. 12.

The VM management server 1100 returns a result of the deployment process to the user 310 (Step S2400), and the processing is brought to an end. Specifically, the deployment request reception part 1130 notifies the terminal 300 of the result of the deployment process through the service NW 1005 and the network 200.

Figure 11:
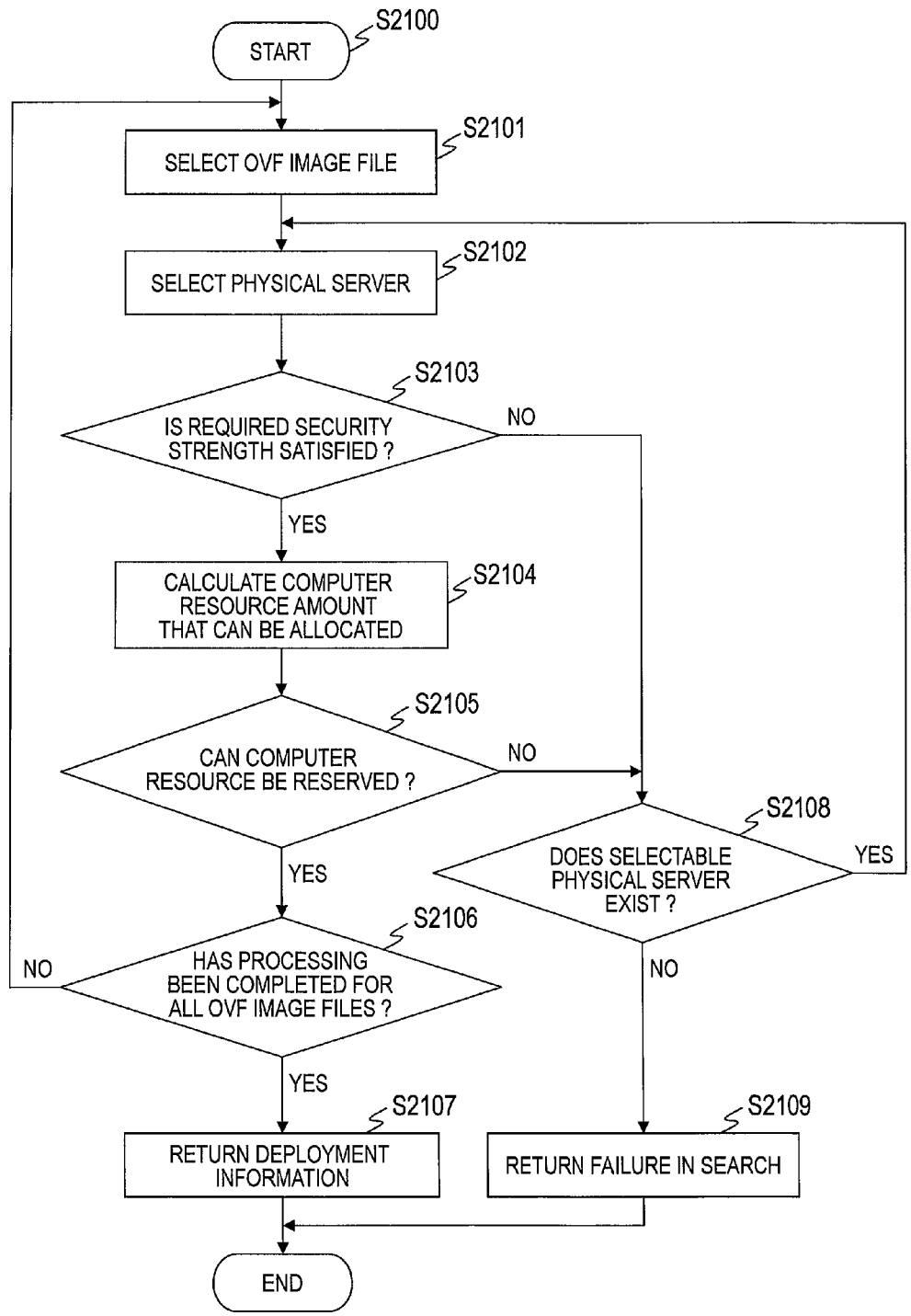
FIG. 11 is a flowchart illustrating an example of a search process for the physical server executed by a physical server search part according to the first embodiment of this invention.

FIG. 11 is a flowchart illustrating an example of the search process for the physical server executed by the physical server search part 1131 according to the first embodiment of this invention.

In a case of being called by the deployment request reception part 1130, the physical server search part 1131 starts the processing (Step S2100).

The physical server search part 1131 refers to the VM package management table 1140 based on the received deployment request to select one of the target OVF image files 1411 (Step S2101).

Specifically, the physical server search part 1131 refers to the VM package management table 1140 to retrieve the entry whose VM package name 11402 matches the name of the VM package 1410 included in the deployment request. In addition, the physical server search part 1131 refers to the OVF IDs 11403 of the entry to select one of the OVF IDs 11403.

The physical server search part 1131 refers to the physical server configuration table 1120 to select one of the physical servers that is the subject to be processed (Step S2102). In this embodiment, the physical server search part 1131 selects the physical servers in order from the top entry of the physical server configuration table 1120. It should be noted that the entry may be selected based on the performance of the computer resource. For example, it is conceivable to select the physical servers in descending order of the value of the number of CPU cores 1122.

The physical server search part 1131 determines whether or not the selected physical server satisfies the required security strength necessary to deploy the selected target OVF image file 1411 (Step S2103). Specifically, the following processing is executed.

The physical server search part 1131 refers to the VM package management table 1140 to determine whether or not the value of the required security strength 11405 of the entry corresponding to the selected target OVF image file 1411 is larger than "0".

In a case where it is determined that the value of the required security strength 11405 is equal to or smaller than "0", in other words, that the value of the required security strength 11405 is "0", the physical server search part 1131 determines that the selected physical server satisfies the required security strength necessary to deploy the selected target OVF image file 1411.

In a case where it is determined that the value of the required security strength 11405 is larger than "0", in other words, that the value of the required security strength 11405 is "1", the physical server search part 1131 refers to the physical server configuration table 1120 to determine whether or not the presence/absence of the equipped TPM 1125 of the entry corresponding to the selected physical server is "present".

In a case where it is determined that the presence/absence of the equipped TPM 1125 is not "present", the physical server search part 1131 determines that the selected physical server does not satisfy the required security strength necessary to deploy the selected target OVF image file 1411.

In a case where it is determined that the presence/absence of the equipped TPM 1125 is "present", the physical server search part 1131 determines that the selected physical server satisfies the required security strength necessary to deploy the selected target OVF image file 1411.

The processing of Step S2103 has been described above.

In a case where it is determined in Step S2103 that the selected physical server satisfies the required security strength necessary to deploy the selected target OVF image file 1411, the physical server search part 1131 calculates a computer resource amount that can be allocated to the selected physical server (Step S2104). In addition, the physical server search part 1131 determines based on a calculation result of the computer resource whether or not the computer resource amount necessary to deploy the target OVF image file 1411 can be reserved (Step S2105). Specifically, the following processing is executed.

The physical server search part 1131 refers to the VM allocation table 1110 to extract the entry whose physical server ID 1113 matches the identifier (physical server ID 1121) of the selected physical server.

The physical server search part 1131 calculates a total value of the numbers of allocated CPU cores 1115 of all the extracted entries. The physical server search part 1131 calculates the number of CPU cores that can be allocated by subtracting the calculated total value from the number of CPU cores 1122 of the selected physical server.

It should be noted that, in a case where the OVF type 1112 of the selected OVF image file 1411 is "trusted authentication" or "trusted execution", the physical server search part 1131 adds the number of CPU cores necessary for the VM 1220 for the virtual TPM to the above-mentioned total value. The physical server search part 1131 uses the total value to calculate the number of CPU cores that can be allocated.

The physical server search part 1131 calculates the total value of the allocated memory amounts 1116 of all the extracted entries. The physical server search part 1131 calculates a memory amount that can be allocated by subtracting the calculated total value from the memory amount 1124 of the selected physical server.

It should be noted that, in a case where the OVF type 1112 of the selected OVF image file 1411 is "trusted authentication" or "trusted execution", the physical server search part 1131 adds the memory amount necessary for the VM 1220 for the virtual TPM to the above-mentioned total value. The physical server search part 1131 uses the total value to calculate the memory amount that can be allocated.

The physical server search part 1131 multiplies the calculated number of CPU cores that can be allocated by the value of the CPU performance 1123, and determines whether or not the multiplied value is larger than the required CPU performance 11407.

In a case where the multiplied value is equal to or smaller than the required CPU performance 11407, the physical server search part 1131 determines that the computer resource amount necessary to deploy the OVF image file 1411 cannot be reserved.

In a case where the multiplied value is larger than the required CPU performance 11407, the physical server search part 1131 determines whether or not the memory amount that can be allocated is larger than the required memory amount 11408.

In a case where the memory amount that can be allocated is equal to or smaller than the required memory amount 11408, the physical server search part 1131 determines that the computer resource amount necessary to deploy the target OVF image file 1411 cannot be reserved.

In a case where the memory amount that can be allocated is larger than the required memory amount 11408, the physical server search part 1131 determines that the computer resource amount necessary to deploy the target OVF image file 1411 can be reserved.

The processing of Step S2104 and Step S2105 has been described above.

In a case where it is determined in Step S2105 that the computer resource amount necessary to deploy the target OVF image file 1411 cannot be reserved, the physical server search part 1131 advances to Step S2108.

In a case where it is determined in Step S2105 that the computer resource amount necessary to deploy the target OVF image file 1411 can be reserved, the physical server search part 1131 determines whether or not the processing has been completed for all the target OVF image files 1411 included in the VM package 1410 (Step S2106). At this time, the physical server search part 1131 generates or updates deployment information in which the identifier of the selected target OVF image file 1411 and the identifier of the selected physical server are associated with each other. Further, the deployment information also includes information necessary to generate the VM using the target OVF image file 1411, in other words, the information stored in the allocated resource 1114.

In a case where it is determined that the processing has not been completed for all the target OVF image files 1411 included in the VM package 1410, the physical server search part 1131 returns to Step S2101 to execute the same processing.

In a case where it is determined that the processing has been completed for all the target OVF image files 1411 included in the VM package 1410, the physical server search part 1131 outputs a processing start instruction including the deployment information (Step S2107), and brings the processing to an end.

It should be noted that the deployment information also includes the value of the required security strength 11405 of the target OVF image file 1411.

In a case where it is determined in Step S2103 that the selected physical server does not satisfy the required security strength, or in a case where it is determined that the computer resource amount necessary to deploy the target OVF image file 1411 cannot be reserved, the physical server search part 1131 determines whether or not a selectable physical server exists (Step S2108).

In other words, it is determined whether or not the processing has been completed for all the entries included in the physical server configuration table 1120. In a case where the processing has been completed for all the entries included in the physical server configuration table 1120, it is determined that a selectable physical server does not exist.

In a case where it is determined that a selectable physical server exists, the physical server search part 1131 returns to Step S2102 to execute the same processing.

In a case where it is determined that a selectable physical server does not exist, the physical server search part 1131 returns a failure in the search to the deployment request reception part 1130 (Step S2109), and brings the processing to an end.

In the following description, the physical server determined to be able to reserve the computer resource amount necessary to deploy the OVF image file 1411 is also referred to as "target physical server".

Figure 12:
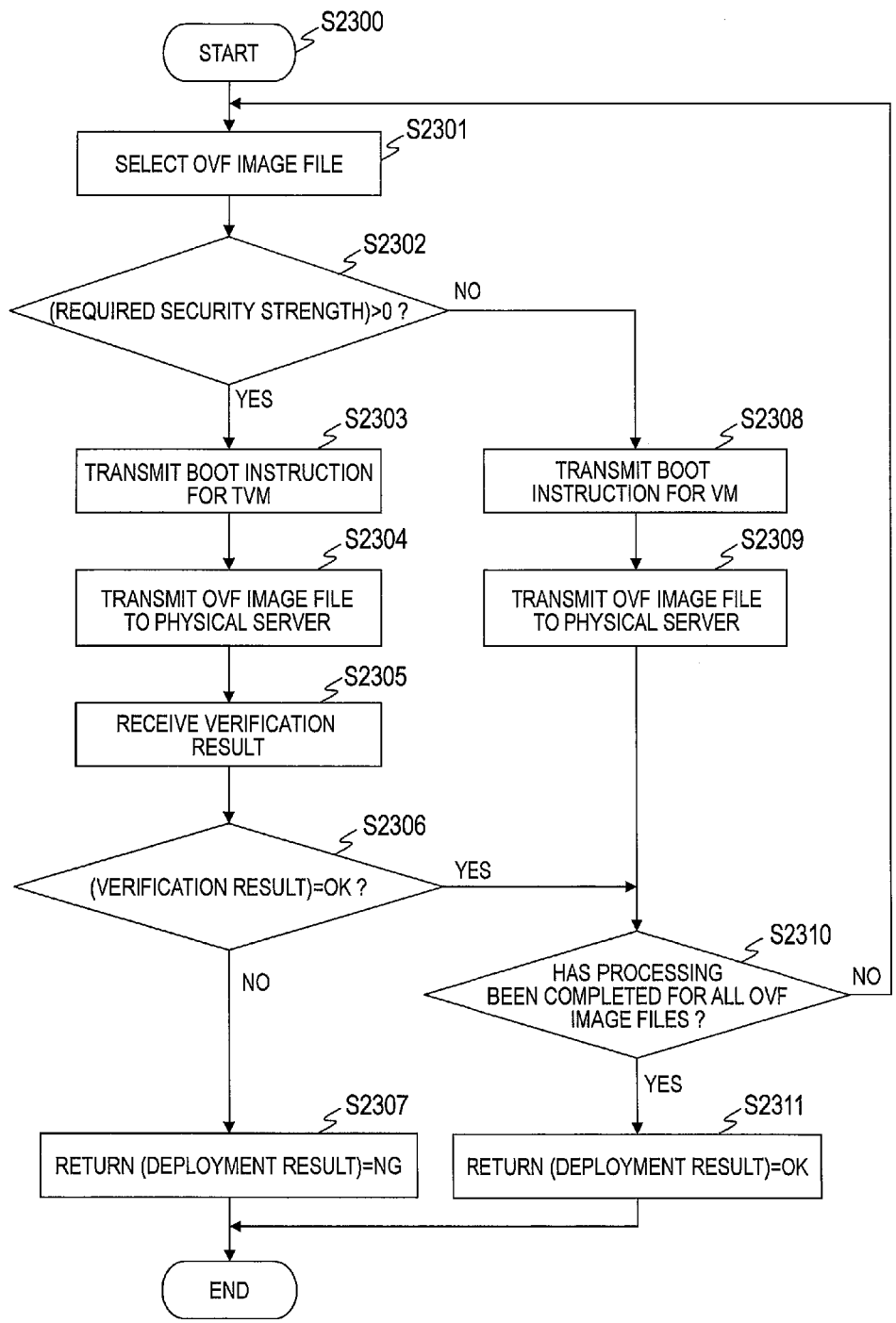
FIG. 12 is a flowchart illustrating a deployment process executed by a deployment instruction part according to the first embodiment of this invention.

FIG. 12 is a flowchart illustrating the deployment process executed by the deployment instruction part 1132 according to the first embodiment of this invention.

The deployment instruction part 1132 starts the processing, in a case of receiving the processing start instruction from the physical server search part 1131 (Step S2300).

The deployment instruction part 1132 refers to the deployment information to select one of the target OVF image files 1411 (Step S2301).

The deployment instruction part 1132 determines whether or not the value of the required security strength associated with the selected target OVF image file 1411 is larger than "0" (Step S2302). In other words, it is determined whether or not the deployment process is performed for the trusted VM 1230.

In a case where it is determined that the value of the required security strength associated with the target OVF image file 1411 is larger than "0", the deployment instruction part 1132 transmits a boot instruction for a trusted VM to the target physical server (Step S2303). In addition, the deployment instruction part 1132 transmits the target OVF image file 1411 to the target physical server (Step S2304). In this case, the TPM-equipped physical server 1200 serves as the target physical server.

At this time, the deployment instruction part 1132 transmits the OVF image file 1411 for generating the VM 1220 for the virtual TPM to the target physical server. Further, the deployment instruction part 1132 also transmits the destination address 11410 of the application providing system 400 for providing the target OVF image file 1411 to the TPM-equipped physical server 1200.

It should be noted that it is assumed that the OVF image file 1411 for generating the VM 1220 for the virtual TPM is obtained from the VM package management DB 1400 including the selected target OVF image file 1411. However, this invention is not limited thereto, and the trusted hypervisor 1210 may have information for generating the VM 1220 for the virtual TPM common to all the VM packages 1410.

The TPM-equipped physical server 1200 receives the boot instruction for the trusted VM 1230 and the OVF image file 1411, and then executes a boot process for the trusted VM 1230. The boot process for the trusted VM 1230 is described later with reference to FIG. 13A and FIG. 13B.

The deployment instruction part 1132 receives the verification result for the integrity report from the target physical server (Step S2305), and determines whether or not the verification result is a verification result indicating that the integrity is maintained (Step S2306).

In a case where it is determined that the verification result is a verification result indicating that the integrity is maintained, the deployment instruction part 1132 advances to Step S2310.

In a case where it is determined that the verification result is a verification result indicating that the integrity is not maintained, the deployment instruction part 1132 outputs "NG" as a deployment result (Step S2307), and brings the processing to an end.

At this time, it is assumed that the deployment instruction part 1132 transmits an instruction to abort the boot process to the TPM-equipped physical server 1200 to which, the boot instruction for the trusted VM 1230 has been transmitted and the physical server 1300 to which the boot instruction for the VM 1330 has been transmitted.

In Step S2302, in a case where the value of the required security strength associated with the target OVF image file 1411 is "0", in other words, in a case where the deployment process is performed for the normal VM 1330, the deployment instruction part 1132 transmits a boot instruction for a VM to the target physical server (Step S2308). In addition, the deployment instruction part 1132 transmits the target OVF image file 1411 to the target physical server (Step S2309). In this case, the physical server 1300 serves as the target physical server.

After the physical server 1300 receives the boot instruction for the VM and the OVF image file 1411, the hypervisor 1310 generates the VM 1330, and the OS 1335 is booted on the generated VM 1330. It should be noted that known technologies may be used as a generation method for the VM 1330 and a boot method for the OS 1335, detailed descriptions of which are omitted.

After the processing of Step S2309 or in a case where it is determined in Step S2306 that the verification result is a verification result indicating that the integrity is maintained, the deployment instruction part 1132 determines whether or not the processing has been completed for all the OVF image files 1411 included in the deployment information (Step S2310).

In a case where it is determined that the processing has not been completed for all the OVF image files 1411 included in the deployment information, the deployment instruction part 1132 returns to Step S2301 to execute the same processing.

In a case where it is determined that the processing has been completed for all the OVF image files 1411 included in the deployment information, the deployment instruction part 1132 outputs "OK" as a deployment result (Step S2311), and brings the processing to an end.

As described above, in this embodiment, in the case where the trusted VM 1230 is deployed, the search is performed for the physical server whose required security strength 11405 is equal to or larger than a predetermined value. In other words, the search is performed for the TPM-equipped physical server 1200. This can prevent, for example, the VM from being tampered, the user from being spoofed, and the illegal application from being executed or spread.

Figure 13A:
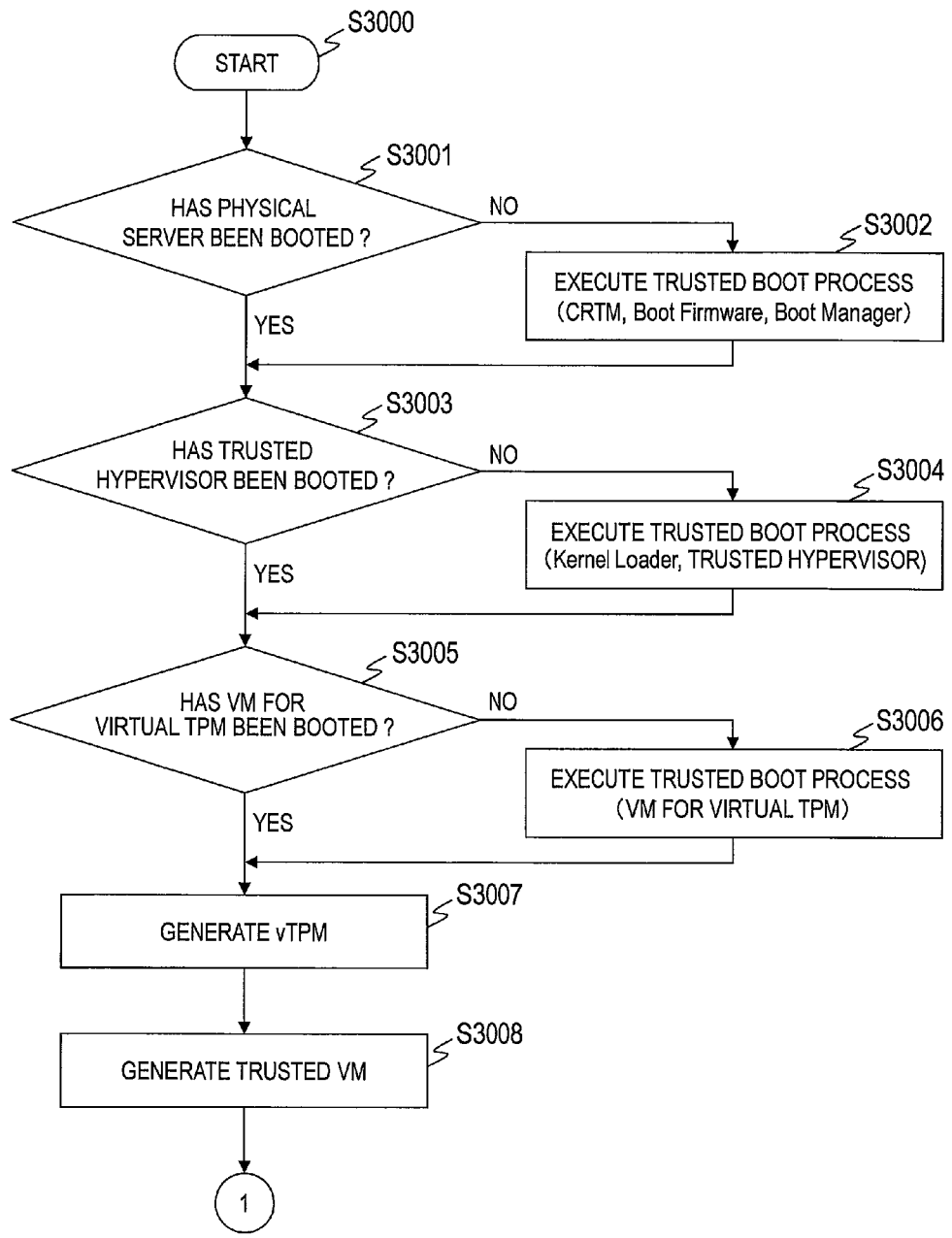
FIG. 13A and FIG. 13B are flowcharts illustrating a boot process for a trusted VM executed by the TPM-equipped physical server according to the first embodiment of this invention.
Figure 13B:
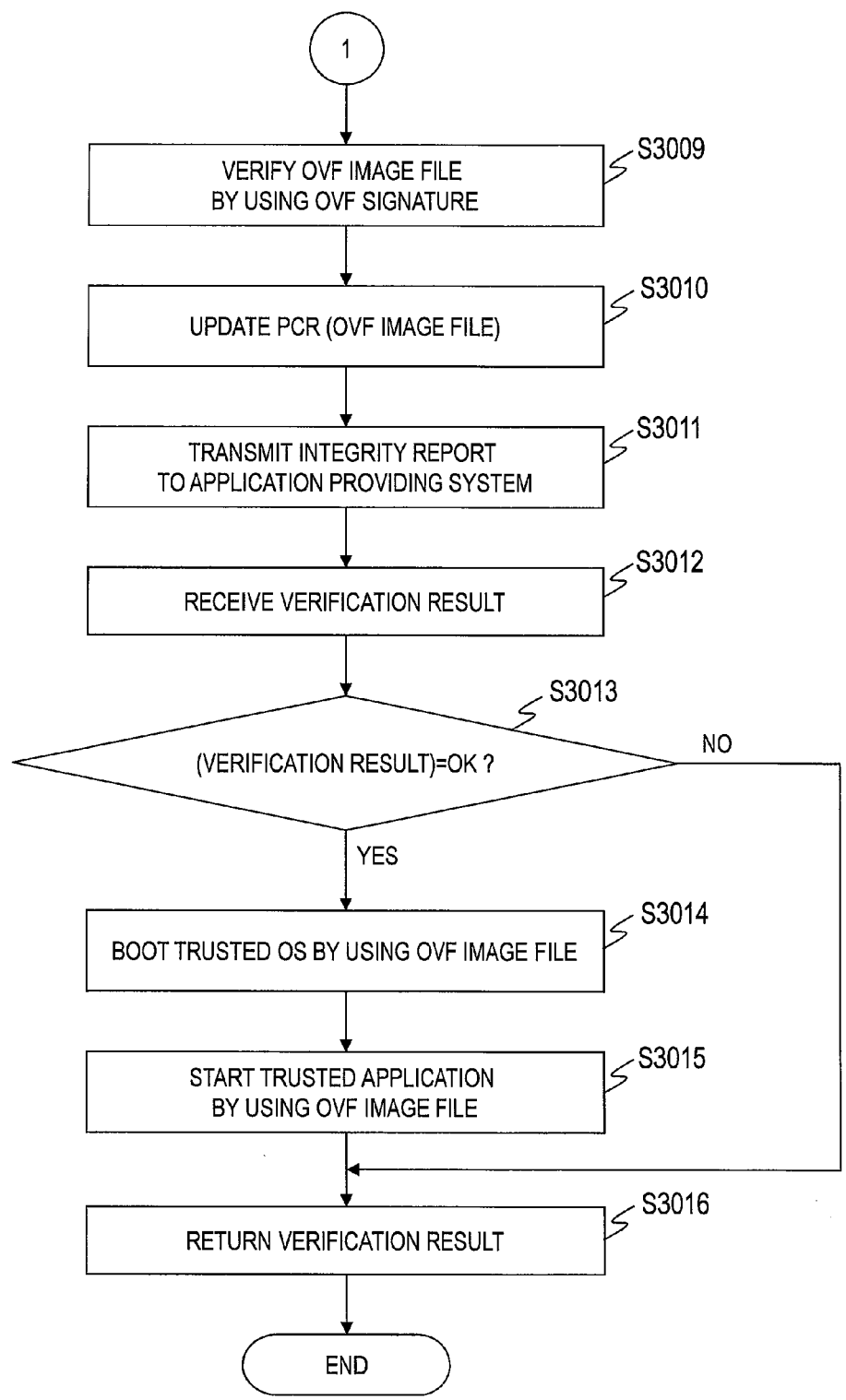

FIG. 13A and FIG. 13B are flowcharts illustrating the boot process for the trusted VM 1230 executed by the TPM-equipped physical server 1200 according to the first embodiment of this invention.

The TPM-equipped physical server 1200 starts the boot process for the trusted VM 1230, in a case of receiving the boot instruction for the trusted VM 1230 and the target OVF image file 1411 from the VM management server 1100 (Step S3000).

First, it is determined whether or not the TPM-equipped physical server 1200 has been booted (Step S3001). Specifically, the BMC 1104 determines whether or not the TPM-equipped physical server 1200 is in a power-on status. In a case where the TPM-equipped physical server 1200 is in the power-on status, it is determined that the TPM-equipped physical server 1200 has been booted.

In a case where it is determined that the TPM-equipped physical server 1200 has been booted, the subsequent processing is performed starting from Step S3003.

On the other hand, in a case where it is determined that the TPM-equipped physical server 1200 has not been booted, the BMC 1104 controls a power source of the TPM-equipped physical server 1200 to be in an on status. With the power source in the on status, the TPM-equipped physical server 1200 executes a trusted boot process (Step S3002). Specifically, the following processing is executed.

The CPU 1250 obtains the hash value of the CRTM 1242, and writes the hash value of the CRTM 1242 to the PCR 1275. After that, the CPU 1250 executes the CRTM 1242. In addition, the CPU 1250 that executes the CRTM 1242 obtains the hash value of the boot firmware 1244, and writes the hash value of the boot firmware 1244 to the PCR 1275. After that, the CPU 1250 starts the boot firmware 1244.

The boot firmware 1244 obtains the hash value of the boot manager 1247, and writes the hash value of the boot manager 1247 to the PCR 1275. After that, the boot firmware 1244 starts the boot manager 1247.

The processing of Step S3002 has been described above.

Subsequently, the TPM-equipped physical server 1200 determines whether or not the trusted hypervisor 1210 has been booted (Step S3003). For example, it is determined whether or not the trusted boot process is underway.

In a case where it is determined that the trusted hypervisor 1210 has been booted, the TPM-equipped physical server 1200 advances to Step S3005.

In a case where it is determined that the trusted hypervisor 1210 has not been booted, the TPM-equipped physical server 1200 continues the trusted boot process (Step S3004). Specifically, the following processing is executed.

The boot manager 1247 reads the kernel loader 1211, obtains the hash value of the read kernel loader 1211, and writes the hash value of the kernel loader 1211 to the PCR 1275. After that, the boot manager 1247 executes the kernel loader 1211.

The kernel loader 1211 reads the image of the trusted hypervisor 1210, obtains the hash value of the read image of the trusted hypervisor 1210, and stores the hash value of the image of the trusted hypervisor 1210 in the PCR 1275. After that, the kernel loader 1211 boots the trusted hypervisor 1210.

The processing of Step S3004 has been described above.

Subsequently, the TPM-equipped physical server 1200 determines whether or not the VM 1220 for the virtual TPM has been booted (Step S3005). Specifically, the trusted hypervisor 1210 determines whether or not the VM 1220 for the virtual TPM has been booted.

In a case where it is determined that the VM 1220 for the virtual TPM has been booted, the TPM-equipped physical server 1200 advances to Step S3007.

In a case where it is determined that the VM 1220 for the virtual TPM has not been booted, the TPM-equipped physical server 1200 continues the trusted boot process (Step S3006). Specifically, the following processing is executed.

The trusted hypervisor 1210 reads the OVF image file 1411 for generating the VM 1220 for the virtual TPM, obtains the hash value of the read OVF image file 1411, and writes the hash value of the OVF image file 1411 to the PCR 1275.

After that, the trusted hypervisor 1210 uses the read OVF image file 1411 to generate the VM 1220 for the virtual TPM, and boots the generated VM 1220 for the virtual TPM. It should be noted that known technologies may be used as a generation method for the VM 1220 for the virtual TPM and a boot method therefor, detailed descriptions of which are omitted.

The processing of Step S3006 has been described above.

Subsequently, the TPM-equipped physical server 1200 generates the vTPM 1231 (Step S3007). The TPM-equipped physical server 1200 uses the received target OVF image file 1411 to generate a predetermined trusted VM 1230 (Step S3008).

Specifically, the trusted hypervisor 1210 controls the VM 1220 for the virtual TPM to generate the vTPM 1231. The trusted hypervisor 1210 generates the trusted VM 1230 by allocating the vTPM 1231 and a predetermined computer resource.

At this point in time, with the computer resource allocated, the trusted OS 1235 or the trusted application 1236 is not operating on the trusted VM 1230. It should be noted that a known technology may be used as a generation method for the vTPM 1231, a detailed description of which is omitted.

The TPM-equipped physical server 1200 verifies the OVF image file 1411 by using the OVF signature 1412 corresponding to the received OVF image file 1411 (Step S3009).

At this time, the TPM-equipped physical server 1200 obtains the OVF signature 1412 corresponding to the received OVF image file 1411 from the VM package management DB 1400. It should be noted that a known technology may be used as the verification process for the OVF image file 1411 using the OVF signature 1412, a detailed description of which is omitted.

In a case where the verification process of Step S3009 produces a result indicating an error, the TPM-equipped physical server 1200 outputs the verification result indicating illegality to the VM management server 1100, and brings the processing to an end. In a case where the verification process of Step S3009 produces a result that does not indicate an error, the TPM-equipped physical server 1200 advances to Step S3010.

The TPM-equipped physical server 1200 obtains the hash value of the received OVF image file 1411, and writes the hash value of the OVF image file 1411 to the PCR 1275 (Step S3010).

Specifically, the trusted hypervisor 1210 obtains the hash value of the received OVF image file 1411, and writes the hash value of the obtained OVF image file 1411 to the PCR 1275.

The TPM-equipped physical server 1200 transmits the integrity report to the application providing system 400 for providing the received OVF image file 1411 (Step S3011).

Specifically, the trusted hypervisor 1210 transmits the integrity report to the IP address corresponding to the received destination address 11410. The integrity report includes the hash value stored in the PCR 1275.

It should be noted that the integrity report may include cryptographic key information on the vTPM 1231 allocated to the generated trusted VM 1230. Here, the cryptographic key information on the vTPM 1231 corresponds to the endorsement key 1274 within the vTPM 1231.

It should be noted that the processing executed by the application providing system 400 is described later with reference to FIG. 14.

In a case of receiving a result of the integrity report from the application providing system 400 (Step S3012), the TPM-equipped physical server 1200 determines whether or not the result of the integrity report is a result indicating that the integrity is maintained (Step S3013).

In a case where it is determined that the result of the integrity report is a result indicating the illegality, the TPM-equipped physical server 1200 returns the result of the integrity report (Step S3016), and brings the processing to an end.

In a case where it is determined that the result of the integrity report is the result indicating that the integrity is maintained, the TPM-equipped physical server 1200 boots the trusted OS 1235 by using the received OVF image file 1411 (Step S3014).

Various modes are conceivable for the boot process for the trusted OS 1235. In this embodiment, for example, the following boot process is executed.

The trusted hypervisor 1210 obtains the hash value of a virtual BIOS, and writes the hash value of the virtual BIOS to the PCR 1275 of the vTPM 1231. After that, the trusted hypervisor 1210 starts the virtual BIOS. The virtual BIOS is a BIOS emulated by the trusted hypervisor 1210. At this time, the writing of the hash value to the vTPM 1231 is emulated by the VM 1220 for the virtual TPM.

After that, the virtual BIOS calls a virtual kernel loader, and the virtual kernel loader boots the trusted OS 1235. At this time, the virtual BIOS obtains the hash value of the virtual kernel loader, and the virtual kernel loader obtains the hash value of the trusted OS 1235. The virtual BIOS and the virtual kernel loader each write the obtained hash value to a PCR of the vTPM 1231. At this time, the writing of the hash value to the PCR of the vTPM 1231 is emulated by the VM 1220 for the virtual TPM, and the hash value is written to the PCR 1275.

An example of the boot process for the trusted OS 1235 has been described above.

Subsequently, the TPM-equipped physical server 1200 starts the trusted application 1236 by using the received OVF image file 1411 (Step S3015).

Specifically, the trusted OS 1235 obtains the hash value of the trusted application 1236, and writes the hash value of the trusted application 1236 to the PCR of the vTPM 1231. After that, the trusted OS 1235 executes the trusted application 1236.

The TPM-equipped physical server 1200 returns the result of the integrity report (Step S3016), and brings the processing to an end.

Figure 14:
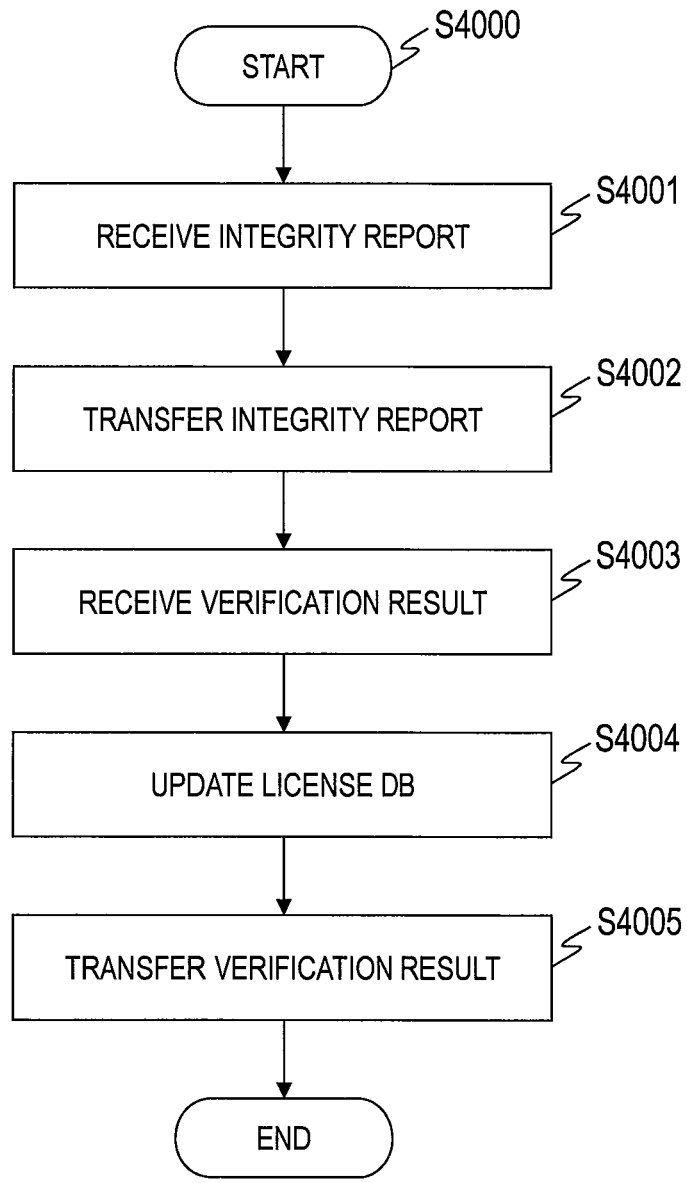
FIG. 14 is a flowchart illustrating the processing executed by an authentication server according to the first embodiment of this invention.

FIG. 14 is a flowchart illustrating the processing executed by the authentication server 410 according to the first embodiment of this invention.

In a case of receiving the integrity report from the TPM-equipped physical server 1200 (Step S4001), the authentication server 410 transfers the received integrity report to the verification engine system 500 (Step S4002).

In the verification engine system 500, the verification server 510 executes a predetermined verification process based on the integrity report, the IIDB 520, and the VULDB 530, and outputs the verification result. The verification server 510 transmits the output verification result to the application providing system 400. It should be noted that a known technology may be used as the verification process, a description of which is omitted.

In a case of receiving the verification result (Step S4003), the authentication server 410 updates the license DB 430 based on the verification result (Step S4004). Specifically, the following process is executed.

The authentication server 410 analyzes the verification result, and determines whether or not the verification result indicates that content of the integrity report is correct.

In a case where it is determined that the verification result indicates that the content of the integrity report is correct, the authentication server 410 adds information relating to a newly generated VM to the license DB 430. On the other hand, in a case where it is determined that the verification result indicates that the content of the integrity report is incorrect, the authentication server 410 advances to the next step without updating the license DB 430.

The authentication server 410 transfers the received verification result to the TPM-equipped physical server 1200 (Step S4005), and brings the processing to an end.

As described above, the integrity report is transmitted to the application providing system 400. With this configuration, the application vendor that operates an application providing system can grasp the usage status of the VM package 1410 to be provided.

According to the first embodiment, the integrity of the VM, the OS, and the application can be guaranteed because the physical server of a deployment destination is selected based on the security strength. With this configuration, a safe cloud service can be realized. Further, in the first embodiment, the integrity report is transmitted through the application providing system 400. With this configuration, the application providing system 400 can grasp the usage status of the application operating on the cloud system 1000.

Second Embodiment

After the trusted OS 1235 is booted, the authentication process is periodically executed between the trusted VM 1230 and the application providing system 400 in order to monitor whether or not the trusted application 1236 has been tampered. Here, a number of licenses and a status such as the execution status of the application are examined in the authentication process for the trusted application 1236.

In this case, there is a case where performance required by the user 310 cannot be exhibited because communications in the authentication process become a bottle neck. In the second embodiment, a description is made of a system for guaranteeing the integrity of the trusted application 1236 and inhibiting processing performance of the trusted application 1236 from being lowered.

The following description is made by focusing on a difference from the first embodiment.

The configuration of the computer system is the same as that of the first embodiment, and hence a description thereof is omitted. Further, the hardware configurations and the software configurations of the VM management server 1100 and the physical server 1300 are the same as those of the first embodiment, and hence descriptions thereof are omitted.

Figure 15:
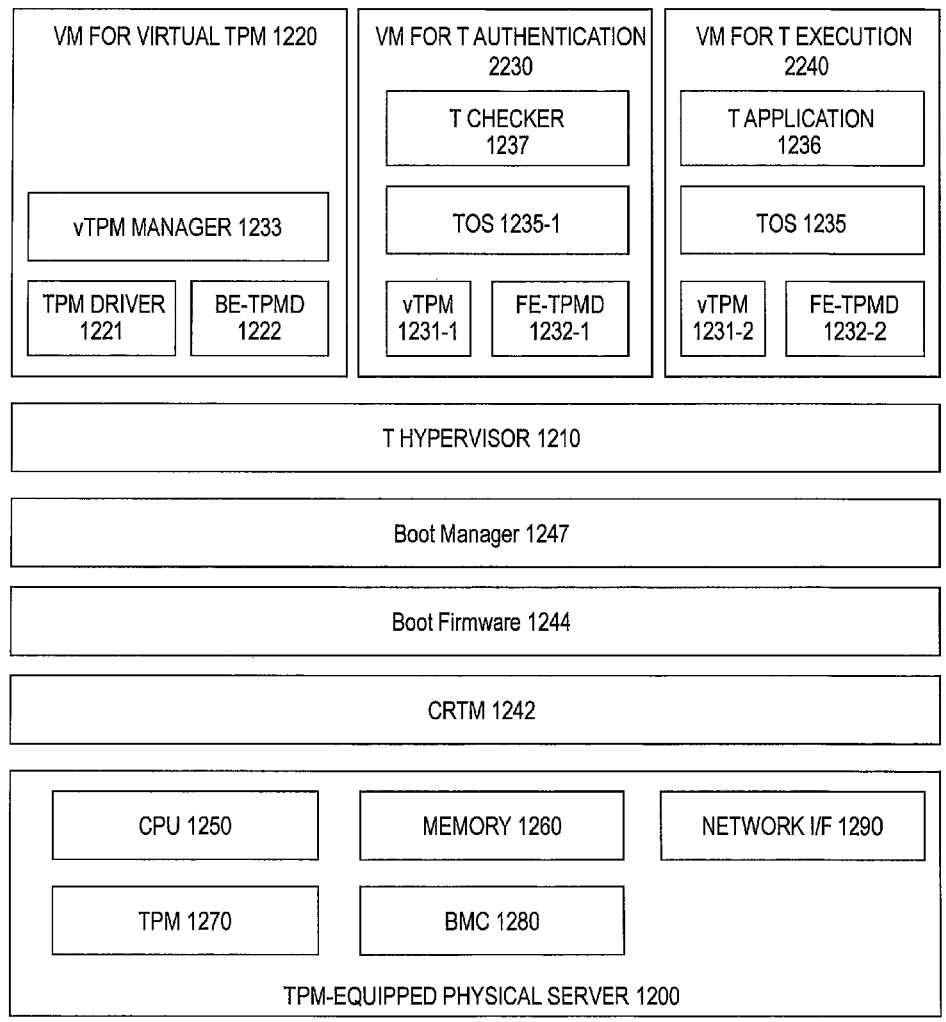
FIG. 15 is a block diagram illustrating an example of the hardware configuration and the software configuration of the TPM-equipped physical server according to the second embodiment of this invention.

FIG. 15 is a block diagram illustrating an example of the hardware configuration and the software configuration of the TPM-equipped physical server 1200 according to the second embodiment of this invention.

The hardware configuration of the TPM-equipped physical server 1200 is the same as that of the first embodiment. The second embodiment is different from the first embodiment in that there exist two VMs, specifically, a VM 2230 for trusted authentication and a VM 2240 for trusted execution. The software configuration is the same as that of the first embodiment in the other points.

The VM 2230 for trusted authentication is a VM for communicating to/from the application providing system 400. A trusted checker 1237 is executed on the VM 2230 for trusted authentication. The trusted checker 1237 is an application for executing the authentication process for the trusted application 1236.

Further, the VM 2240 for trusted execution is a VM for executing the trusted application 1236 which is an application provided by the application vendor.

Therefore, the VM package 1410 according to the second embodiment includes the OVF image file 1411 for generating the VM 2230 for trusted authentication and the OVF image file 1411 for generating the VM 2240 for trusted execution.

It should be noted that the VM 2240 for trusted execution is configured to communicate to/from the VM 2230 for trusted authentication in order to authenticate the trusted application 1236. Further, one VM 2230 for trusted authentication and at least one VM 2240 for trusted execution operate on the TPM-equipped physical server 1200.

Next, each kind of processing according to the second embodiment is described.

The processing executed by the VM management server 1100 is the same as that of the first embodiment, and hence a description thereof is omitted. The second embodiment is different from the first embodiment in the boot process for the trusted VM 1230.

The processing of Step S3001 to Step S3007 is the same as the processing of those of the first embodiment.

In Step S3008, the TPM-equipped physical server 1200 generates the VM 2230 for trusted authentication and the VM 2240 for trusted execution.

In Step S3009 to Step S3013, the TPM-equipped physical server 1200 transmits the integrity report for each of the VM 2230 for trusted authentication and the VM 2240 for trusted execution, and executes a determination process for the result of the integrity report.

In Step S3013, it is determined whether or not the results of the integrity reports for both the VM 2230 for trusted authentication and the VM 2240 for trusted execution are the result indicating that the integrity is maintained.

In a case where it is determined that the results of the integrity reports for both the VMs are the result indicating that the integrity is maintained, the TPM-equipped physical server 1200 boots the trusted OS 1235 on the VM 2230 for trusted authentication. After that, the TPM-equipped physical server 1200 boots the trusted OS 1235 on the VM 2240 for trusted execution.

In addition, the TPM-equipped physical server 1200 starts the trusted checker 1237 on the VM 2230 for trusted authentication, and starts the trusted application 1236 on the VM 2240 for trusted execution.

With this configuration, the integrity of the VM 2240 for trusted execution and the VM 2230 for trusted authentication is guaranteed. In other words, it is guaranteed that the VM, the OS, and the application are inhibited from, for example, being tampered.

Figure 16:
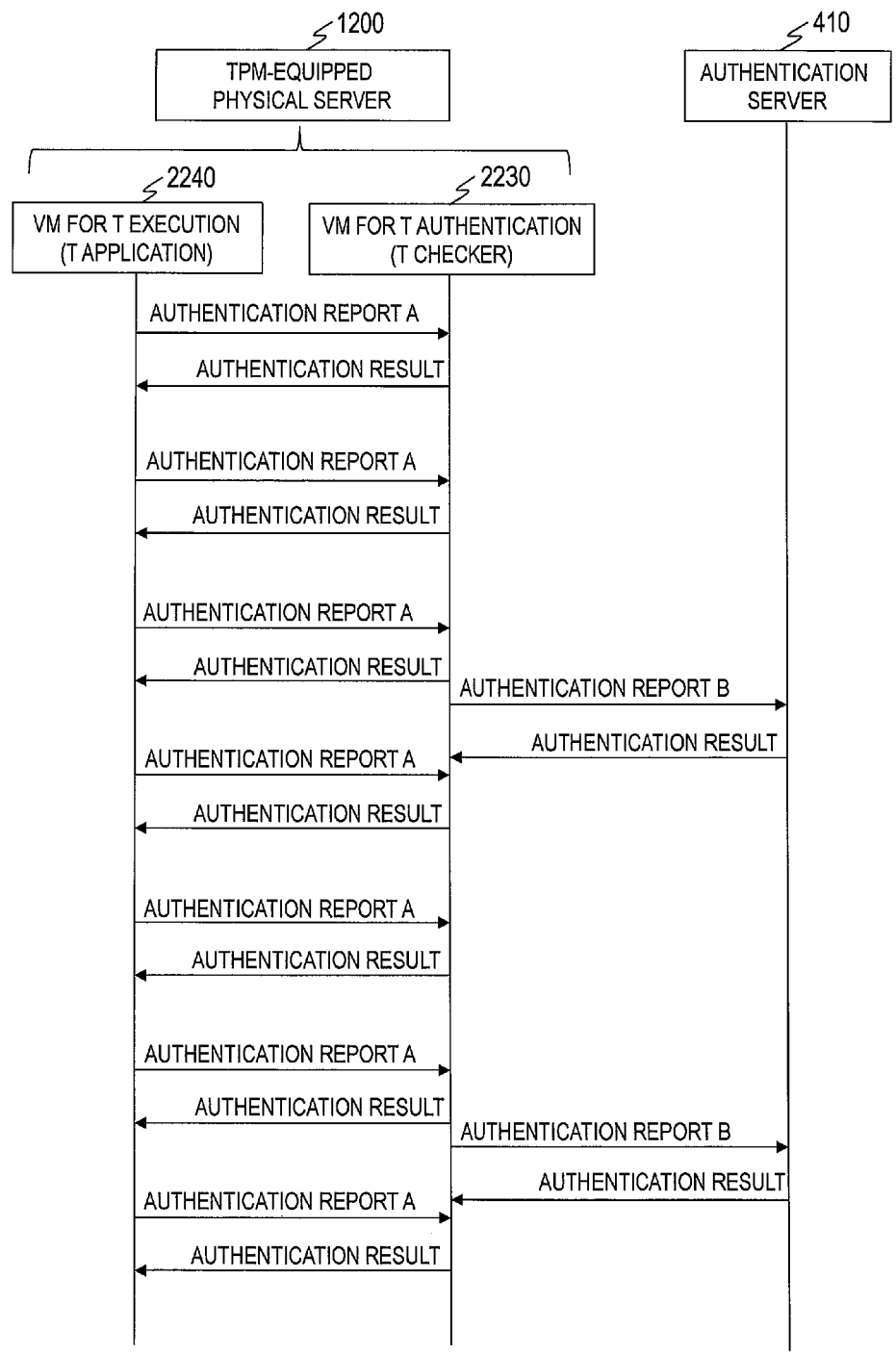
FIG. 16 is a sequence diagram illustrating a authentication process for a trusted application according to the second embodiment of this invention.

FIG. 16 is a sequence diagram illustrating the authentication process for the trusted application 1236 according to the second embodiment of this invention.

The VM 2230 for trusted authentication and the VM 2240 for trusted execution operate on the TPM-equipped physical server 1200. Further, the trusted checker 1237 is executed on the VM 2230 for trusted authentication. The trusted application 1236 is executed on the VM 2240 for trusted execution.

The trusted application 1236 periodically transmits an authentication report A to the trusted checker 1237.

In a case of receiving the authentication report A, the trusted checker 1237 executes the authentication process based on the authentication report A, and transmits an authentication result to the trusted application 1236. The authentication report A includes, for example, a license number and the number of times that the application is executed.

The trusted checker 1237 transmits an authentication report B including a plurality of authentication reports A to the authentication server 410.

The authentication server 410 executes the authentication process based on the authentication report B. A known process may be used as the authentication process executed by the authentication server 410, a detailed description of which is omitted.

At this time, in a case where a result of the authentication process for at least one authentication report A indicates illegality, the authentication server 410 transmits the authentication result indicating the illegality to the trusted checker 1237. The trusted checker 1237 inhibits a valid authentication result from being returned to the trusted application 1236 once determined to be illegal thereafter, to thereby prevent the trusted application from being illegally executed. It should be noted that the above-mentioned determination method for the authentication process is merely an example, and this invention is not limited thereto.

As described above, communications between the trusted application 1236 and the trusted checker 1237 are communications within the memory 1260. Therefore, frequent communications in the authentication process do not affect the processing performance of the trusted application 1236.

According to the second embodiment, it is possible to authenticate the application in execution without deteriorating processing performance of the application.

Third Embodiment

In a third embodiment of this invention, the trusted hypervisor 1210 encrypts and transmits the integrity report.

The following description is made by focusing on a difference from the first embodiment.

The configuration of the computer system is the same as that of the first embodiment, and hence a description thereof is omitted. Further, the hardware configurations and the software configurations of the VM management server 1100 and the physical server 1300 are the same as those of the first embodiment, and hence descriptions thereof are omitted.

Figure 17:
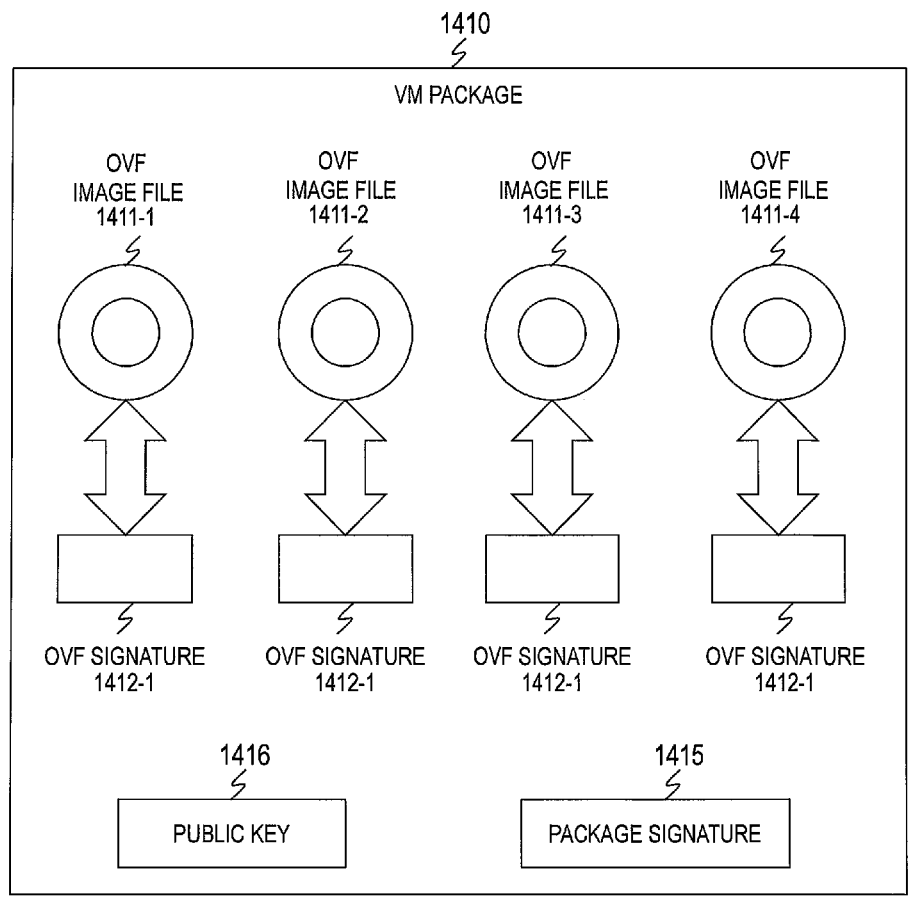
FIG. 17 is an explanatory diagram illustrating an example of the VM package 1410 according to the third embodiment of this invention.

FIG. 17 is an explanatory diagram illustrating an example of the VM package 1410 according to the third embodiment of this invention.

A public key 1416 is newly included in the VM package 1410 according to the third embodiment. The public key 1416 is a public key generated in the application providing system 400.

For example, the VM package distribution server 420 generates a public key and a secret key in advance, and distributes the VM package 1410 including the generated public key to the cloud system 1000. With this configuration, the VM package 1410 as illustrated in FIG. 17 is registered in the VM package management DB 1400. It should be noted that it is assumed that the secret key is output from the VM package distribution server 420 to the authentication server 410. In other words, the authentication server 410 has the secret key.

The above-mentioned management method for the cryptographic key is merely an example, and the authentication server 410 may generate the public key and the secret key.

Next, each kind of processing according to the third embodiment is described.

The processing executed by the VM management server 1100 is the same as that of the first embodiment, and hence a description thereof is omitted. The third embodiment is different from the first embodiment in the boot process for the trusted VM 1230.

The processing of Step S3001 to Step S3010 is the same as the processing of those of the first embodiment.

In Step S3011, the trusted hypervisor 1210 encrypts the integrity report by using the public key 1416 included in the OVF image file 1411. For example, all the hash values stored in the PCR 1275 are encrypted. After that, the trusted hypervisor 1210 transmits the encrypted integrity report to the authentication server 410.

The processing of Step S3012 to Step S3016 is the same as the processing of those of the first embodiment.

Figure 18:
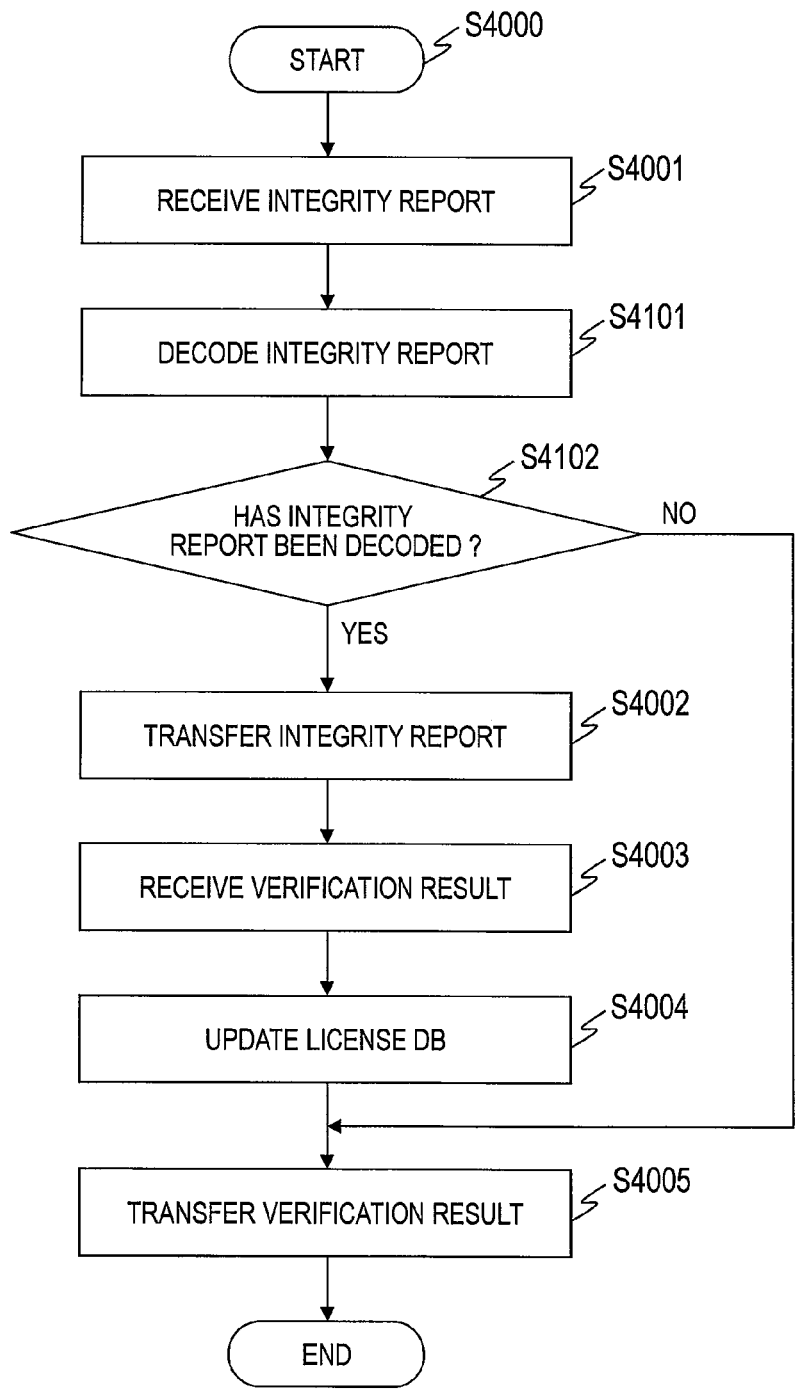
FIG. 18 is a flowchart illustrating a processing executed by the authentication server according to the third embodiment of this invention.

FIG. 18 is a flowchart illustrating the processing executed by the authentication server 410 according to the third embodiment of this invention.

In a case of receiving the encrypted integrity report from the TPM-equipped physical server 1200 (Step S4001), the authentication server 410 decodes the integrity report that has been encrypted by using the secret key (Step S4101). In addition, the authentication server 410 determines whether or not the encrypted integrity report has been decoded (Step S4102).

In a case where it is determined that the encrypted integrity report has been decoded, the authentication server 410 executes the processing of Step S4002 to Step S4005. It should be noted that the processing of Step S4002 to Step S4005 is the same as the processing of those of the first embodiment.

In a case where it is determined that the encrypted integrity report has failed to be decoded, the authentication server 410 brings the processing to an end without transferring the received integrity report to the verification engine system 500.

Further, in the third embodiment, the processing executed by the TPM-equipped physical server 1200 is partially different.

In Step S3012, the TPM-equipped physical server 1200 determines whether or not the verification result has been received. For example, a time period for timeout is set in advance, and when the verification result has not been returned after the lapse of the time period, the TPM-equipped physical server 1200 determines that the verification result has not been received.

In a case where it is determined that the verification result has been received, the TPM-equipped physical server 1200 executes the processing of Step S3013 to Step S3016.

In a case where it is determined that the verification result has not been received, the TPM-equipped physical server 1200 returns the verification result indicating the illegality (Step S3016), and brings the processing to an end.

According to the third embodiment, it is possible to prevent, for example, the illegal authentication of the application providing system 400, to thereby produce an effect of enhancing security in the computer system.

It should be noted that different kinds of software exemplified in this embodiment can be stored in different kinds of, for example, electromagnetic, electronic, and optical recording media (for example, non-transitory storage media), and can be downloaded onto the computer through a communication network such as the Internet. The description of this embodiment is directed to the example of using the control in a software manner, but part thereof can be realized in a hardware manner.

Various software described in this embodiment can be stored in electromagnetic, electronic or optical type etc various recording media (for example, a non-transitory storage medium), and can be downloaded to a computer through network, such as the Internet.

Although this embodiment described has been described the example using control by software, it is also possible to realize a part of the function provided software by hardware.

This invention has been described in detail with reference to the accompanying drawings. However, those concrete configurations are not to limit this invention, and this invention encompasses various modifications and equivalent configurations within the spirit of the scope of claims set forth below.

What is claimed is:

1. A computer system, comprising:
   a plurality of computers each including: a processor; a memory coupled to the processor; and a network interface coupled to the processor;
   a virtual computer system including a computer resource allocated to at least one virtual computer of a plurality of virtual computers; and
   a verification system for verifying the at least one virtual computer,
   wherein the virtual computer system comprises:
   a plurality of servers for providing the computer resource to the at least one virtual computer;
   a management computer for managing the plurality of virtual computers that operate on each of the plurality of servers; and
   an image data storage part storing image data for generating a virtual computer for executing an application of the plurality of virtual computers,
   wherein the verification system includes a verification server for verifying an integrity relating to the virtual computer for executing the application, the virtual computer system comprising:
   image data management information in which the image data and a first security strength required on a boot of the virtual computer for executing the application generated based on the image data is associated with the image data; and
   server management information in which a second security strength is set and associated with each of the plurality of servers,
   wherein the virtual computer system further comprises:
   a deployment request reception part for receiving, from a user using the virtual computer system, a deployment request including identification information for identifying a target image data, of the image data, for generating the virtual computer for executing the application;
   a server search part for searching for a server of the plurality of servers, for which the second security strength equal to or greater than the first security strength associated with the target image data is set, based on the image data management information and the server management information;
   a deployment instruction part for instructing a first retrieved server having the second security strength equal to or greater than the first security strength associated with the target image data to deploy the target image data; and
   a virtual computer management part for generating the virtual computer for executing the application on the first retrieved server by using the target image data, and transmitting a first integrity report, which is obtained on the boot of the virtual computer for executing the application and used to verify the integrity relating to the virtual computer for executing the application, to the verification server, wherein the virtual computer management part receives a result of a verification process with respect to the first integrity report, wherein the result of the verification process is transmitted from the verification server, wherein the deployment request reception part outputs a deployment result for the target image data based on the received result of the verification process with respect to the first integrity report, wherein the computer system further comprises:

an application providing system for distributing the image data stored in the image data storage part, the application providing system comprises:

an authentication server for verifying an integrity of the application executed on the virtual computer for executing the application generated based on the image data, and monitoring a usage status of the application; and a license data storage part for storing information indicating the usage status of the application, wherein the virtual computer management part transmits the first integrity report to the authentication server, and wherein the authentication server is configured to:

transfer the received first integrity report to the verification server;

update the information stored in the license data storage part based on the first integrity report received from the virtual computer management part and the result of the verification process with respect to the first integrity report received from the verification server; and transfer the result of the verification process with respect to the first integrity report received from the verification server to the virtual computer management part.

2. The computer system according to claim 1 wherein the application providing system has a secret key and a public key, the image data is associated with the public key, and the image data associated with the public key is registered in the image data storage part, wherein the virtual computer management part is configured to:

encrypt the first integrity report by using the public key; and transmit the encrypted first integrity report to the authentication server, wherein the authentication server is configured to:

determine whether the encrypted first integrity report can be decoded by using the secret key; and transfer the decoded first integrity report to the verification server, in a case where it is determined that the encrypted first integrity report can be decoded by using the secret key.

3. The computer system according to claim 1, wherein the image data stored in the image data storage part comprises:

a plurality of first pieces of image data for generating the virtual computer for execution for executing the application; and a plurality of second pieces of image data for generating a virtual computer for authentication for performing communications to verify the integrity of the application executed on the virtual computer for executing the application, wherein the image data storage part stores software including at least one first piece of image data and at least one second piece of image data, wherein the identification information on the target image data included in the deployment request is identification information on the software, wherein the first security strength is associated with each of the plurality of first pieces of image data, and the second security strength is associated with each of the plurality of second pieces of image data of the image data, wherein the server search part is configured to:

search for a second retrieved server for which a third security strength equal to or greater than a first security strength associated with the first piece of image data included in the software designated by the user is set; and search for a third retrieved server for which a fourth security strength equal to or greater than the second security strength associated with the second piece of image data included in the software designated by the user is set;

wherein the deployment instruction part is configured to:

instruct the second retrieved server having the third security strength equal to or greater than the first security strength associated with the first piece of image data included in the software designated by the user to deploy the first piece of image data included in the software designated by the user; and instruct the third retrieved server having the fourth security strength equal to or greater than the second security strength associated with the second piece of image data included in the software designated by the to deploy the second piece of image data included in the software designated by the user;

wherein the virtual computer for execution generated based on the first piece of image data transmits a second integrity report including information indicating an execution status of the application to the virtual computer for authentication generated based on the second piece of image data every first period, and wherein the virtual computer for authentication generated based on the second piece of image data is configured to:

transmit a third integrity report including a plurality of the second integrity reports to the authentication server every second period that is longer than the first period; and return the second integrity report based on a verification result with respect to the third integrity report that is received by the authentication server.

4. The computer system according to claim 1, wherein the image data management information further includes information relating to the computer resource necessary for the virtual computer for executing the application generated by using the image data, which is associated with the image data;

wherein the plurality of servers include a third server, which is trusted platform module (TPM) equipped, and wherein the server search part is configured to:

refer to the server management information to search for a second retrieved server, in a case where the first security strength associated with the target image data is a value indicating that a boot process for the virtual computer for executing the application using the TPM is necessary;

calculate a computer resource amount that can be allocated to the second retrieved server;

determine whether the virtual computer for executing the application can be generated on a third retrieved server that has the first security strength associated with the target image data as the value indicating that the boot process for the virtual computer for executing the application using the TPM is necessary by using the target image data, based on the image data management information and the calculated computer resource amount that can be allocated; and output deployment information for generating the virtual computer for executing the application by using the target image data, in a case where it is determined that the virtual computer for executing the application can be generated on the second retrieved server by using the target image data.

5. The computer system according to claim 4,
wherein the virtual computer management part generates a second virtual computer for a virtual TPM, of the plurality of virtual computers, for emulating the TPM on the second retrieved server;
wherein the second virtual computer for the virtual TPM generates the virtual TPM allocated to the virtual computer for executing the application generated by using the target image data;
wherein the virtual computer management part generates the virtual computer for executing the application based on the target image data, the generated virtual TPM, and the computer resource of the second retrieved server; and
wherein the virtual computer for executing the application starts executing the application based on the result of the verification process with respect to the first integrity report.

6. The computer system according to claim 5,
wherein the second retrieved server writes a value indicating a status of a program executed in the boot process for the virtual computer for executing the application using the image data to the virtual TPM,
wherein the second virtual computer for the virtual TPM writes the value written to the virtual TPM to the TPM, and
wherein the virtual computer management part transmits the first integrity report including the value written to the TPM.

7. A virtual computer management method performed in a computer system including a plurality of computers,
the plurality of computers each including: a processor; a memory coupled to the processor; and a network interface coupled to the processor;
the computer system comprising:
a virtual computer system including a computer resource allocated to at least one virtual computer of a plurality of virtual computers; and
a verification system for verifying the at least one virtual computer,
wherein the virtual computer system comprises:
a plurality of servers for providing the computer resource to the at least one virtual computer;
a management computer for managing the plurality of virtual computers that operates on each of the plurality of servers; and
an image data storage part for storing image data for generating a virtual computer for executing an application of the plurality of virtual computers,
wherein the verification system comprises:
a verification server for verifying an integrity of the virtual computer for executing the application; and a data-for-verification storage part for storing information used to verify the integrity of the virtual computer for executing the application,
wherein the virtual computer system further comprises:
image data management information in which the image data and a first security strength required on a boot of the virtual computer for executing the application generated based on the image data is associated with the image data; and
server management information in which a second security strength is set and associated with each of the plurality of servers,
the virtual computer management method comprising:
a first step of receiving, by the management computer, from a user using the virtual computer system, a deployment request including identification information for identifying a target image data, of the image data, for generating the virtual computer for executing the application;
a second step of searching, by the management computer, for a server of the plurality of servers, for which the second security strength equal to or greater than the first security strength associated with the target image data is set, based on the image data management information and the server management information;
a third step of instructing, by the management computer, a first retrieved server having the second security strength equal to or greater than the first security strength associated with the target image data to deploy the target image data;
a fourth step of generating, by the server instructed to deploy the target image data, the virtual computer for executing the application by using the target image data, and transmitting a first integrity report, which is obtained on the boot of the virtual computer for executing the application and used to verify the integrity relating to the virtual computer for executing the application, to the verification server;
a fifth step of receiving, by the first retrieved server instructed to deploy the target image data, a result of a verification process with respect to the first integrity report, wherein the result of the verification process is transmitted from the verification server;
a sixth step of transmitting, by the first retrieved server instructed to deploy the target image data, the received result of the verification process with respect to the first integrity report to the management computer; and
a seventh step of outputting, by the management computer, a deployment result for the target image data to the user based on the received result of the verification process with respect to the first integrity report,
wherein the computer system further comprises an application providing system for distributing the image data stored in the image data storage part;
wherein the application providing system comprises:
an authentication server for verifying an integrity of an application executed on the virtual computer for executing the application generated based on the image data, and monitoring a usage status of the application; and
a license data storage part for storing information indicating the usage status of the application, and
wherein the fourth step includes:
an eighth step of transmitting, by the first retrieved server instructed to deploy the target image data, the first integrity report to the authentication server;
a ninth step of transferring, by the authentication server, the received first integrity report to the verification server;

a tenth step of updating, by the authentication server, the information stored in the license data storage part based on the first integrity report received from the first retrieved server and the result of the verification process with respect to the first integrity report received from the verification server; and an eleventh step of transferring, by the authentication server, the result of the verification process with respect to the first integrity report received from the verification server to the first retrieved server instructed to deploy the target image data.

8. The virtual computer management method according to claim 7 wherein the application providing system has a secret key and a public, the image data is associated with the public key and the image data associated with the public key is registered in the image data storage part, wherein the eighth step includes:

encrypting, by the server instructed to deploy the target image data, the first integrity report by using the public key; and transmitting, by the server instructed to deploy the target image data, the encrypted first integrity report to the authentication server, and wherein the ninth step includes:

determining, by the authentication server, whether the encrypted first integrity report can be decoded by using the secret key; and transferring, by the authentication server, the decoded first integrity report to the verification server, in a case where it is determined that the encrypted first integrity report can be decoded by using the secret key.

9. The virtual computer management method according to claim 7, wherein the image data stored in the image storage part includes:

a plurality of first pieces of image data for generating the virtual computer for execution for executing the application; and a plurality of second pieces of image data for generating a virtual computer for authentication for performing communications to verify the integrity of the application executed on the virtual computer for executing the application, wherein the image data storage part stores software including at least one first piece of image data and at least one second piece of image data, wherein the first step includes receiving the deployment request including identification information on the software, wherein the first security strength is associated with each of the plurality of first pieces of image data and, the second security strength is associated with each of the plurality of second pieces of image data of the image data, wherein the second step comprises:

searching, by the management computer, for a second retrieved server for which a third security strength equal to or greater than the first security strength associated with the first piece of image data included in the software designated by the user is set; and searching, by the management computer, for a third retrieved server for which a fourth security strength equal to or greater than the second security strength associated with the second piece of image data included in the software designated by the user is set;

wherein the third step includes:

instructing, by the management computer, the second retrieved server having the third security strength equal to or greater than the first security strength associated with the first piece of image data included in the software designated by the user to deploy the first piece of image data included in the software designated by the user; and instructing, by the management computer, the third retrieved server having the fourth security strength equal to or greater than the second security strength associated with the second piece of image data included in the software designated by the to deploy the second piece of image data included in the software designated by the user; and the virtual computer management method further includes:

transmitting, by the virtual computer for execution generated based on the first piece of image data, a second integrity report including information indicating an execution status of the application to the virtual computer for authentication generated based on the second piece of image data every first period;

transmitting, by the virtual computer for authentication generated based on the second piece of image data, a third integrity report including a plurality of the second integrity reports to the authentication server every second period that is longer than the first period; and returning, by the virtual computer for authentication generated based on the second piece of image data, the second integrity report based on a result of a verification process with respect to the third integrity report that is received by the authentication server.

10. The virtual computer management method according to claim 7, wherein the image data management information further includes information relating to the computer resource necessary for the virtual computer for executing the application generated by using the image data, which is associated with the image data and the security strength each other, wherein the plurality of servers include a third server, which is trusted platform module (TPM) equipped, wherein the second step includes:

referring to the server management information to search for a second retrieved server, in a case where the first security strength associated with the target image data is a value indicating that a boot process for the virtual computer for executing the application using the TPM is necessary;

calculating a computer resource amount that can be allocated to the second retrieved server;

determining, based on the image data management information and the calculated computer resource amount that can be allocated, whether the virtual computer for executing the application can be generated on a third retrieved server that has the first security strength associated with the target image data as the value indicating that the boot process for the virtual computer for executing the application using the TPM is necessary by using the target image data; and outputting deployment information for generating the virtual computer for executing the application by using the target image data, in a case where it is determined that the virtual computer for executing the application can be generated on the second retrieved server by using the target image data.

11. The virtual computer management method according to claim 10, wherein the fourth step includes:

a twelfth step of generating, by the second retrieved server, a second virtual computer for a virtual TPM, of the plurality of virtual computers, for emulating the TPM;

a thirteenth step of generating, by the second virtual computer for the virtual TPM, the virtual TPM allocated to the virtual computer for executing the application generated by using the target image data;

a fourteenth step of generating, by the second retrieved server, the virtual computer for executing the application based on the target image data, the generated virtual TPM, and the computer resource of the second retrieved server; and a fifteenth step of starting, by the virtual computer for executing the application, executing the application based on the result of the verification process with respect to the first integrity report.

12. The virtual computer management method according to claim 11, wherein the fourteenth step includes:

writing, by the second retrieved server, a value indicating a status of a program executed in the boot process for the virtual computer for executing the application using the image data to the virtual TPM; and writing, by the second virtual computer for the virtual TPM, the value written to the virtual TPM to the TPM, and wherein the eighth step comprises transmitting the first integrity report comprising the value written to the TPM.

* * * * *